United States Patent
Choi et al.

(10) Patent No.: US 10,291,390 B2
(45) Date of Patent: May 14, 2019

(54) ENDECRYPTOR PREVENTING SIDE CHANNEL ATTACK, DRIVING METHOD THEREOF AND CONTROL DEVICE HAVING THE SAME

(71) Applicant: Samsung Electronics Co., Ltd., Suwon-si, Gyeonggi-do (KR)

(72) Inventors: Hong-Mook Choi, Bucheon-si (KR); Yun-Ho Youm, Seoul (KR); Yong-Ki Lee, Yongin-si (KR); Jin-Su Hyun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/915,789

(22) Filed: Mar. 8, 2018

(65) Prior Publication Data

US 2018/0205535 A1 Jul. 19, 2018

Related U.S. Application Data

(63) Continuation of application No. 14/746,976, filed on Jun. 23, 2015, now abandoned.

(30) Foreign Application Priority Data

Aug. 28, 2014 (KR) ........................ 10-2014-0113471

(51) Int. Cl.
*H04L 9/00* (2006.01)
*H04L 9/06* (2006.01)

(52) U.S. Cl.
CPC ............ *H04L 9/002* (2013.01); *H04L 9/0631* (2013.01); *H04L 2209/24* (2013.01); *H04L 2209/34* (2013.01)

(58) Field of Classification Search
CPC .......................................................... H04L 9/02
USPC .......................................................... 380/287
See application file for complete search history.

(56) References Cited

U.S. PATENT DOCUMENTS

| | | | |
|---|---|---|---|
| 5,796,837 | A | 8/1998 | Kim et al. |
| 6,430,588 | B1 | 8/2002 | Kobayashi et al. |
| 6,510,518 | B1 | 1/2003 | Jaffe et al. |
| 7,848,515 | B2 | 12/2010 | Dupaquis et al. |
| 8,155,317 | B2 | 4/2012 | Motoyama |
| 8,666,064 | B2 | 3/2014 | Choi et al. |
| 2010/0074440 | A1 | 3/2010 | Lee et al. |
| 2010/0153744 | A1 | 6/2010 | Nobukata |
| 2012/0250854 | A1 | 10/2012 | Danger et al. |
| 2015/0171994 | A1 | 6/2015 | Hwang et al. |

OTHER PUBLICATIONS

Bertoni et al., "Power-efficient ASIC Synthesis of Cryptographic Sboxes", published in GLSVLSI '04 Proceedings of the 14th ACM Great Lakes symposium on VLSI, Apr. 26-28, 2004, pp. 277-281.

(Continued)

*Primary Examiner* — Jacob Lipman
(74) *Attorney, Agent, or Firm* — Myers Bigel, P.A.

(57) ABSTRACT

An endecryptor and a control device are provided. The endecryptor includes a first SBOX configured to replace first input data with first substitution data, a transformation unit configured to replace the first input data with second substitution data and an output terminal configured to output encrypted or decrypted output data based on the first and second substitution data.

20 Claims, 20 Drawing Sheets

(56) References Cited

OTHER PUBLICATIONS

Giaconia et al., Area and Power Efficient Synthesis of DPA-Resistant Cryptographic S-Boxes Held jointly with 6th International Conference on Embedded Systems, 20th International Conference on VLSI Design, Jan. 6-10, 2007, pp. 731-737.
Federal Information Processing Standards Publication 197 Announcing the Advanced Encryption Standards (AES), Nov. 26, 2001, 51 pages.
"Trend Technology and industrial prospect of Mobile CPU", published in Keit PD Issue Report, vol. 12-6, retrieved from internet website mel.skku.edu/201207_CPU.pdf, issued on Jul. 2012, pp. 53-89, (38 pages).

LUT

|   |   | \multicolumn{16}{c}{y} |
|---|---|---|---|---|---|---|---|---|---|---|---|---|---|---|---|---|
|   |   | 0 | 1 | 2 | 3 | 4 | 5 | 6 | 7 | 8 | 9 | a | b | c | d | e | f |
| x | 0 | 63 | 7c | 77 | 7b | f2 | 6b | 6f | c5 | 30 | 01 | 67 | 2b | fe | d7 | ab | 76 |
|   | 1 | ca | 82 | c9 | 7d | fa | 59 | 47 | f0 | ad | d4 | a2 | af | 9c | a4 | 72 | c0 |
|   | 2 | b7 | fd | 93 | 26 | 36 | 3f | f7 | cc | 34 | a5 | e5 | f1 | 71 | d8 | 31 | 15 |
|   | 3 | 04 | c7 | 23 | c3 | 18 | 96 | 05 | 9a | 07 | 12 | 80 | e2 | eb | 27 | b2 | 75 |
|   | 4 | 09 | 83 | 2c | 1a | 1b | 6e | 5a | a0 | 52 | 3b | d6 | b3 | 29 | e3 | 2f | 84 |
|   | 5 | 53 | d1 | 00 | ed | 20 | fc | b1 | 5b | 6a | cb | be | 39 | 4a | 4c | 58 | cf |
|   | 6 | d0 | ef | aa | fb | 43 | 4d | 33 | 85 | 45 | f9 | 02 | 7f | 50 | 3c | 9f | a8 |
|   | 7 | 51 | a3 | 40 | 8f | 92 | 9d | 38 | f5 | bc | b6 | da | 21 | 10 | ff | f3 | d2 |
|   | 8 | cd | 0c | 13 | ec | 5f | 97 | 44 | 17 | c4 | a7 | 7e | 3d | 64 | 5d | 19 | 73 |
|   | 9 | 60 | 81 | 4f | dc | 22 | 2a | 90 | 88 | 46 | ee | b8 | 14 | de | 5e | 0b | db |
|   | a | e0 | 32 | 3a | 0a | 49 | 06 | 24 | 5c | c2 | d3 | ac | 62 | 91 | 95 | e4 | 79 |
|   | b | e7 | c8 | 37 | 6d | 8d | d5 | 4e | a9 | 6c | 56 | f4 | ea | 65 | 7a | ae | 08 |
|   | c | ba | 78 | 25 | 2e | 1c | a6 | b4 | c6 | e8 | dd | 74 | 1f | 4b | bd | 8b | 8a |
|   | d | 70 | 3e | b5 | 66 | 48 | 03 | f6 | 0e | 61 | 35 | 57 | b9 | 86 | c1 | 1d | 9e |
|   | e | e1 | f8 | 98 | 11 | 69 | d9 | 8e | 94 | 9b | 1e | 87 | e9 | ce | 55 | 28 | df |
|   | f | 8c | a1 | 89 | 0d | bf | e6 | 42 | 68 | 41 | 99 | 2d | 0f | b0 | 54 | bb | 16 |

```
CASE SBOXIn OF
    8' h00 : SBOXOut = 8' h63
    8' h01 : SBOXOut = 8' h7c
         .
         .
         .
    8' hfe : SBOXOut = 8' hbb
    8' hff : SBOXOut = 8' h16
ENDCASE
```

| Input(X) | SBOX Output(Y) | HW(Y) |
|----------|----------------|-------|
| 00       | 11             | 2     |
| 01       | 00             | 0     |
| 10       | 01             | 1     |
| 11       | 10             | 1     |

FIG. 8A

LUT1

|   | y |   |   |   |   |   |   |   |   |   |   |   |   |   |   |   |
|---|---|---|---|---|---|---|---|---|---|---|---|---|---|---|---|---|
|   |   | 0 | 1 | 2 | 3 | 4 | 5 | 6 | 7 | 8 | 9 | a | b | c | d | e | f |
| x | 0 | 59 | 96 | 99 | 95 | 55 | 55 | 55 | 66 | 93 | 36 | 59 | 55 | 59 | 39 | 95 | 95 |
|   | 1 | 69 | 65 | 63 | 93 | 59 | 63 | 39 | 53 | 93 | 33 | 95 | 95 | 36 | 93 | 95 | 63 |
|   | 2 | 59 | 53 | 39 | 55 | 95 | 95 | 59 | 66 | 93 | 96 | 96 | 56 | 96 | 36 | 96 | 66 |
|   | 3 | 33 | 69 | 59 | 69 | 66 | 35 | 36 | 39 | 39 | 65 | 63 | 95 | 95 | 59 | 55 | 96 |
|   | 4 | 33 | 69 | 56 | 69 | 65 | 59 | 69 | 93 | 65 | 95 | 35 | 59 | 53 | 99 | 55 | 63 |
|   | 5 | 69 | 36 | 33 | 93 | 53 | 56 | 56 | 65 | 59 | 65 | 59 | 93 | 39 | 36 | 66 | 65 |
|   | 6 | 33 | 95 | 99 | 55 | 39 | 33 | 99 | 66 | 36 | 53 | 35 | 95 | 63 | 96 | 35 | 96 |
|   | 7 | 66 | 99 | 33 | 65 | 35 | 33 | 96 | 56 | 56 | 55 | 39 | 56 | 63 | 55 | 59 | 35 |
|   | 8 | 63 | 36 | 69 | 96 | 65 | 39 | 33 | 69 | 63 | 99 | 99 | 93 | 53 | 63 | 63 | 99 |
|   | 9 | 53 | 66 | 35 | 36 | 55 | 59 | 33 | 66 | 35 | 99 | 56 | 63 | 39 | 69 | 35 | 35 |
|   | a | 93 | 95 | 99 | 39 | 33 | 35 | 53 | 66 | 65 | 39 | 96 | 55 | 36 | 36 | 93 | 93 |
|   | b | 99 | 66 | 99 | 53 | 63 | 36 | 39 | 93 | 56 | 65 | 53 | 99 | 56 | 99 | 99 | 36 |
|   | c | 59 | 96 | 56 | 59 | 66 | 95 | 53 | 65 | 96 | 33 | 93 | 65 | 35 | 53 | 65 | 69 |
|   | d | 93 | 99 | 56 | 55 | 36 | 39 | 55 | 39 | 56 | 96 | 69 | 53 | 65 | 66 | 63 | 39 |
|   | e | 96 | 56 | 36 | 66 | 53 | 33 | 69 | 33 | 35 | 69 | 69 | 93 | 69 | 66 | 56 | 35 |
|   | f | 66 | 96 | 63 | 33 | 55 | 95 | 35 | 56 | 36 | 33 | 53 | 35 | 53 | 63 | 55 | 65 |

FIG. 8B

LUT2

|   | y |   |   |   |   |   |   |   |   |   |   |   |   |   |   |   |
|---|---|---|---|---|---|---|---|---|---|---|---|---|---|---|---|---|
|   |   | 0 | 1 | 2 | 3 | 4 | 5 | 6 | 7 | 8 | 9 | a | b | c | d | e | f |
| x | 0 | 3a | ea | ee | ee | a7 | 3e | 3a | a3 | a3 | 37 | 3e | 7e | a7 | ee | 3e | e3 |
|   | 1 | a3 | e7 | aa | ee | a3 | 3a | 7e | a3 | 3e | e7 | 37 | 3a | aa | 37 | e7 | a3 |
|   | 2 | ee | ae | aa | 73 | a3 | aa | ae | aa | a7 | 33 | 73 | a7 | e7 | ee | a7 | 73 |
|   | 3 | 37 | ae | 7a | aa | 7e | a3 | 33 | a3 | 3e | 77 | e3 | 77 | 7e | e7 | e7 | e3 |
|   | 4 | 3a | ea | 7a | 73 | 7e | 37 | 33 | 33 | 37 | ae | e3 | ea | 7a | 7a | 7a | e7 |
|   | 5 | 3a | e7 | 33 | 7e | 73 | aa | e7 | 3e | 33 | ae | e7 | aa | 73 | 7a | 3e | aa |
|   | 6 | e3 | 7a | 33 | ae | 7a | 7e | aa | e3 | 73 | aa | 37 | ea | 33 | aa | aa | 3e |
|   | 7 | 37 | 3a | 73 | ea | a7 | ae | ae | a3 | ea | e3 | e3 | 77 | 73 | aa | aa | e7 |
|   | 8 | ae | 3a | 7a | 7a | 3a | ae | 77 | 7e | a7 | 3e | e7 | ae | 37 | 3e | 7a | ea |
|   | 9 | 33 | e7 | 7a | ea | 77 | 73 | a3 | ee | 73 | 77 | ee | 77 | e7 | 37 | 3e | ee |
|   | a | 73 | a7 | a3 | 33 | 7a | 33 | 77 | 3a | a7 | ea | 3a | 37 | a7 | a3 | 77 | ea |
|   | b | 7e | ae | ae | 3e | ee | e3 | 77 | 3a | 3a | 33 | a7 | 73 | 33 | e3 | 37 | 3e |
|   | c | e3 | ee | 73 | 77 | 7a | 33 | e7 | a3 | 7e | ee | e7 | 7a | 7e | ee | ee | e3 |
|   | d | e3 | a7 | e3 | 33 | 7e | 3a | a3 | 37 | 37 | a3 | 3e | ea | e3 | a7 | 7e | a7 |
|   | e | 77 | ae | ae | 77 | 3a | ea | e7 | a7 | ae | 77 | ee | 7a | a7 | 33 | 7e | ea |
|   | f | ea | 37 | ea | 3e | ea | 73 | 77 | 3e | 77 | aa | 7e | 3a | e3 | 37 | ee | 73 |

FIG. 9A

```
CASE SBOXIn OF
    8' h00 : SBOXOut[7:4] = 4' h5, SBOXOut[3:0] = 4' h9
    8' h01 : SBOXOut[7:4] = 4' h9, SBOXOut[3:0] = 4' h6
    .
    .
    .
    8' hfe : SBOXOut[7:4] = 4' h5, SBOXOut[3:0] = 4' h5
    8' hff : SBOXOut[7:4] = 4' h6, SBOXOut[3:0] = 4' h5
ENDCASE
```

FIG. 9B

```
CASE SBOXIn OF
    8' h00 : SBOXOut[7:4] = 4' h3, SBOXOut[3:0] = 4' ha
    8' h01 : SBOXOut[7:4] = 4' he, SBOXOut[3:0] = 4' ha
    .
    .
    .
    8' hfe : SBOXOut[7:4] = 4' he, SBOXOut[3:0] = 4' he
    8' hff : SBOXOut[7:4] = 4' h7, SBOXOut[3:0] = 4' h3
ENDCASE
```

FIG. 10A

| Input(X) | SBOX1 Output(Y1) | SBOX2 Output(Y2) | Y= Y1 XOR Y2 |
|---|---|---|---|
| 00 | 10 | 01 | 11 |
| 01 | 00 | 00 | 00 |
| 10 | 11 | 10 | 01 |
| 11 | 01 | 11 | 10 |

FIG. 10B

| Input(X) | SBOX1 Output(Y1) | SBOX2 Output(Y2) | Y= Y1 XOR Y2 |
|---|---|---|---|
| 00 | 11 | 00 | 11 |
| 01 | 01 | 01 | 00 |
| 10 | 10 | 11 | 01 |
| 11 | 00 | 10 | 10 |

FIG. 10C

| Input(X) | SBOX1 Output(Y1) | SBOX2 Output(Y2) | Y= Y1 XOR Y2 |
|---|---|---|---|
| 00 | 11 | 00 | 11 |
| 01 | 10 | 10 | 00 |
| 10 | 00 | 01 | 01 |
| 11 | 01 | 11 | 10 |

FIG. 10D

| Input(X) | SBOX1 Output(Y1) | SBOX2 Output(Y2) | Y= Y1 XOR Y2 |
|---|---|---|---|
| 00 | 01 | 10 | 11 |
| 01 | 11 | 11 | 00 |
| 10 | 00 | 01 | 01 |
| 11 | 10 | 00 | 10 |

FIG. 11A

| Input(X) | SBOX1 Output(Y1) | HW(Y1) | SBOX2 Output(Y2) | HW(Y2) | HW(Y1)+HW(Y2) |
|---|---|---|---|---|---|
| 00 | 10 | 1 | 01 | 1 | 2 |
| 01 | 00 | 0 | 00 | 0 | 0 |
| 10 | 11 | 2 | 10 | 1 | 3 |
| 11 | 01 | 1 | 11 | 2 | 3 |

FIG. 11B

| Input(X) | SBOX1 Output(Y1) | HW(Y1) | SBOX2 Output(Y2) | HW(Y2) | HW(Y1)+HW(Y2) |
|---|---|---|---|---|---|
| 00 | 11 | 2 | 00 | 0 | 2 |
| 01 | 01 | 1 | 01 | 1 | 2 |
| 10 | 10 | 1 | 11 | 2 | 3 |
| 11 | 00 | 0 | 10 | 1 | 1 |

FIG. 11C

| Input(X) | SBOX1 Output(Y1) | HW(Y1) | SBOX2 Output(Y2) | HW(Y2) | HW(Y1)+HW(Y2) |
|---|---|---|---|---|---|
| 00 | 11 | 2 | 00 | 0 | 2 |
| 01 | 10 | 1 | 10 | 1 | 2 |
| 10 | 00 | 0 | 01 | 1 | 1 |
| 11 | 01 | 1 | 11 | 2 | 3 |

FIG. 11D

| Input(X) | SBOX1 Output(Y1) | HW(Y1) | SBOX2 Output(Y2) | HW(Y2) | HW(Y1)+HW(Y2) |
|---|---|---|---|---|---|
| 00 | 01 | 1 | 10 | 1 | 2 |
| 01 | 11 | 2 | 11 | 2 | 4 |
| 10 | 00 | 0 | 01 | 1 | 1 |
| 11 | 10 | 1 | 00 | 0 | 0 |

FIG. 12A

| SBOX1 Output(Y1) | SBOX2 Output(Y2) | HW(Y1)+HW(Y2) |
|---|---|---|
| 3 | 3 | 4 |
| 6 | 7 | 5 |
| 5 | 7 | 5 |
| 9 | A | 4 |
| 3 | 7 | 5 |
| 6 | 3 | 4 |
| 5 | 3 | 4 |
| 9 | E | 5 |
| 6 | E | 5 |
| 3 | A | 4 |
| 9 | 3 | 4 |
| 5 | E | 5 |
| 6 | A | 4 |
| 3 | E | 5 |
| 9 | 7 | 5 |
| 5 | A | 4 |

FIG. 12B

| Normal SBOX Output(Y) | HW(Y) |
|---|---|
| 0 | 0 |
| 1 | 1 |
| 2 | 1 |
| 3 | 2 |
| 4 | 1 |
| 5 | 2 |
| 6 | 2 |
| 7 | 3 |
| 8 | 1 |
| 9 | 2 |
| A | 2 |
| B | 3 |
| C | 2 |
| D | 3 |
| E | 3 |
| F | 4 |

FIG. 13
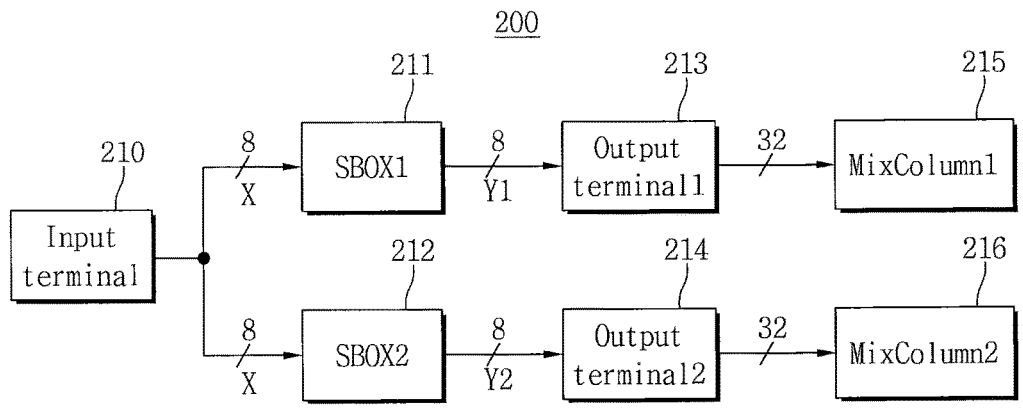
FIG. 14
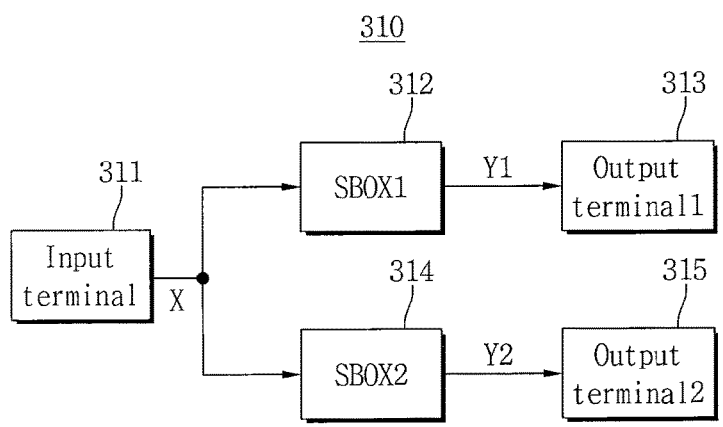
FIG. 15
| Input(X) | SBOX1 Output(Y1) | HW(Y1) | SBOX2 Output(Y2) | HW(Y2) | HW(Y1)+HW(Y2) |
|---|---|---|---|---|---|
| 00 | 110 | 2 | 001 | 1 | 3 |
| 01 | 011 | 2 | 010 | 1 | 3 |
| 10 | 100 | 1 | 110 | 2 | 3 |
| 11 | 001 | 1 | 101 | 2 | 3 |

FIG. 16
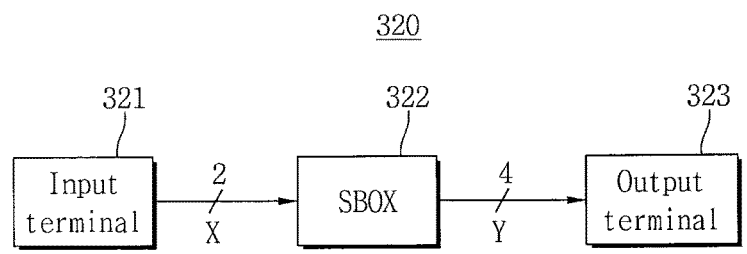
FIG. 17
| Input(X) | HW(X) | SBOX Output(Y) | HW(Y) |
|---|---|---|---|
| 00 | 0 | 1100 | 2 |
| 01 | 1 | 0110 | 2 |
| 10 | 1 | 1001 | 2 |
| 11 | 2 | 0011 | 2 |
FIG. 18A
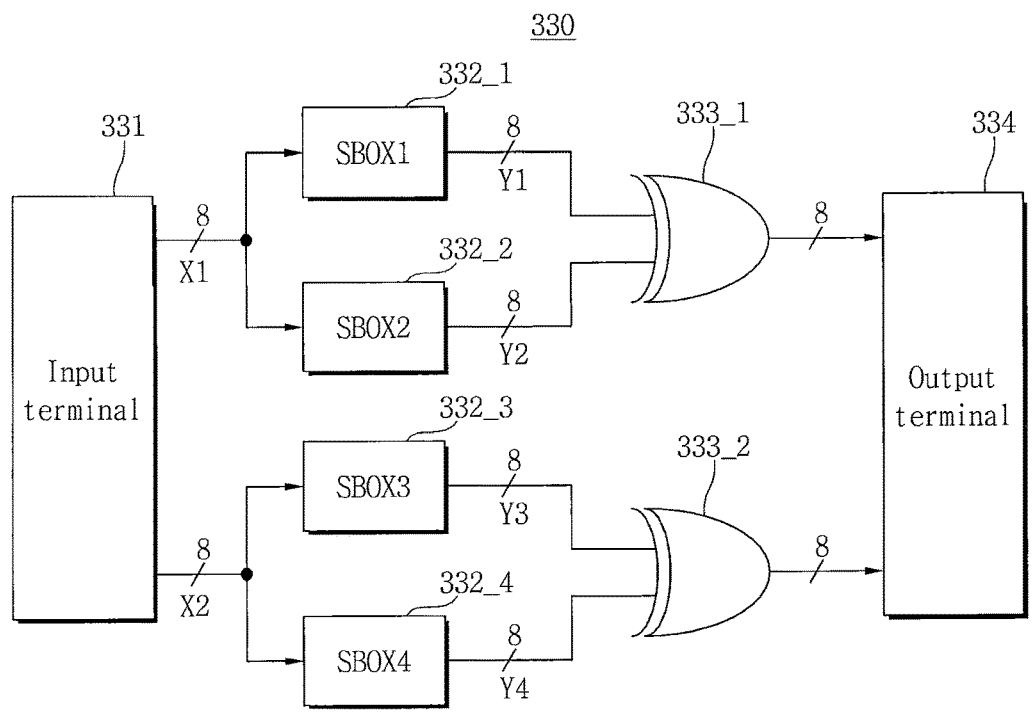

ENDECRYPTOR PREVENTING SIDE CHANNEL ATTACK, DRIVING METHOD THEREOF AND CONTROL DEVICE HAVING THE SAME

CROSS-REFERENCE TO RELATED APPLICATION

This U.S. non-provisional patent application is a continuation of U.S. patent application Ser. No. 14/746,976, filed Jun. 23, 2015, which itself claims priority under 35 U.S.C. § 119 to Korean Patent Application No. 10-2014-00113471 filed on Aug. 28, 2014, the entire contents of which are incorporated herein by reference in their entirety.

BACKGROUND

Field

Embodiments of the inventive concept relate to an endecryptor, and more particularly, to an endecryptor including an SBOX output for protecting a side channel attack.

Description of Related Art

A smart card and an integrated circuit (IC) card include security information about a user. To prevent leakage of the security information of the user from hacking, a hardware encryptor/decryptor, which replaces security information transmitted by a signature or authentication procedure with a cipher text, may be used.

An encryption technique is usually used to ensure the security of data transmission. The encryption technique encrypts a plain text at a transmission side and decrypts a cipher text at a reception side. The encryption of the plain text and the decryption of the cipher text are known as the encryption technique.

Because the speed of an encryption operation is generally slow, an encryptor may be implemented as hardware to be applied to a device, such as a smart card. A block encryption algorithm may include a data encryption standard (DES), an advanced encryption standard (AES), SEED, ARIA, and SM4.

In implementation of an endecryptor, one of the most important factors is to apply a prevention technique with respect to side channel attack. The prevention technique with respect to the side channel attack may be a method that randomly or uniformly generates power and an electromagnetic wave.

In the case of a block cipher algorithm, an SBOX may be a primary target of attack. A method of implementing the SBOX with a technique, which randomly presents side channel information, such as power and an electromagnetic wave, adds a random mask to a composite field and performs mathematical calculations.

A method that randomly presents side channel information may be implemented in various ways. However, the method typically performs mathematically complicated operations.

SUMMARY

Embodiments of the inventive concept provide an endecryptor capable of having a generally small area and performing high-speed operations.

Other embodiments of the inventive concept provide a method of driving the endecryptor.

Other embodiments of the inventive concept provide a system-on-chip that includes the endecryptor.

The technical objectives of the inventive concept are not limited to the above disclosure; other objectives may become apparent to those of ordinary skill in the art based on the following description.

In accordance with one aspect of the inventive concept, an endecryptor includes a first SBOX configured to replace first input data with first substitution data, a transformation unit configured to replace the first input data with second substitution data and an output terminal configured to output encrypted or decrypted output data based on the first and second substitution data.

In an embodiment, the transformation unit may output a dummy bit for adjusting hamming weight of the output data as part of the second substitution data.

In another embodiment, the endecryptor further comprises a logic unit configured to perform a logic operation on the first substitution data and the second substitution data to generate combined substitution data. The output terminal generates the output data based on the combined substitution data.

In another embodiment, the output terminal may generate the output data by performing a logic operation with respect to the first and second substitution data.

In still another embodiment, the transformation unit may include a second SBOX to replace the first input data with the second substitution data.

In yet another embodiment, the first SBOX and the second SBOX may have a different configuration.

In yet another embodiment, the number of the first input data may be N, the number of each of the first substitution data and the second substitution data may be M, the first SBOX may be configured to replace one of the N number of the first input data with one of the M number of the first substitution data, the second SBOX may be configured to replace one of the N number of the second input data with one of the M number of the second substitution data, and N may be a natural number greater than M.

In yet another embodiment, at least one of the first SBOX and the second SBOX may receive the first input data and generates a dummy bit.

In yet another embodiment, the endecryptor may further include an input terminal configured to transmit the first input data to the first SBOX and the second SBOX, and the input terminal may include pre-charge logic.

In yet another embodiment, the first SBOX may be embodied in a first look-up table, the second SBOX may be embodied in a second look-up table, and the first look-up table and the second look-up table may be different from each other.

In yet another embodiment, the endecryptor further may include a third SBOX configured to replace second input data with third substitution data and a fourth SBOX configured to replace the second input data with fourth substitution data and the output terminal configured to output encrypted or decrypted output data based on the first to fourth substitution data and a configuration of each of the first to fourth SBOXs is different from each other.

In yet another embodiment, the endecryptor may replace the first substitution data and the second substitution data with cipher data according to a block encryption algorithm.

In accordance with another aspect of the inventive concept, a control device includes an endecryptor configured to replace a plain text with cipher data according to a block encryption algorithm or replace the cipher data with the plain text and a processor configured to process the plain text, and the endecryptor includes a first SBOX configured to replace first input data with first substitution data, a transformation unit configured to replace the first input data with second substitution data and an output terminal configured to output encrypted or decrypted output data based on the first and second substitution data.

In an embodiment, the transformation unit may output a dummy bit for adjusting a hamming weight of the output data as part of the second substitution data.

In another embodiment, the output terminal may generate the output data by performing a logic operation with respect to the first and second substitution data.

In still another embodiment, the number of the first input data may be N, the number of each of the first substitution data and the second substitution data may be M, the first SBOX may replace one of the N number of the first input data with one of the M number of the first substitution data, and N may be a natural number greater than M.

In yet another embodiment, the transformation unit may include a second SBOX to replace the first input data with the second substitution data and the first SBOX and the second SBOX may have a different configuration.

In yet another embodiment, the endecryptor may further include an input terminal configured to transmit the first input data to the first SBOX and the second SBOX, and the input terminal may include a pre-charge logic.

In yet another embodiment, one of the first SBOX and the second SBOX may receive the first input data and generates a dummy bit.

In yet another embodiment, the endecryptor may further include a third SBOX configured to replace second input data with third substitution data and a fourth SBOX configured to replace the second input data with fourth substitution data and the output terminal configured to output encrypted or decrypted output data based on the first to fourth substitution data and a configuration of each of the first to fourth SBOXs is different from each other.

In yet another embodiment, the endecryptor may replace the first substitution data and the second substitution data with cipher data according to the block encryption algorithm.

Other methods, systems, and/or devices according to embodiments of the inventive subject matter will be or become apparent to one with skill in the art upon review of the following drawings and detailed description. It is intended that all such additional methods, systems, and/or devices be included within this description, be within the scope of the present inventive concepts, and be protected by the accompanying claims. Moreover, it is intended that all embodiments disclosed herein can be implemented separately or combined in any way and/or combination

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings:

FIG. 8A is a table illustrating a look-up table included in a first SBOX shown in FIG. 7;

FIG. 8B is a table illustrating a look-up table included in a second SBOX shown in FIG. 7;

FIG. 9A shows pseudo code for implementing the look-up table shown in FIG. 8A;

FIG. 9B shows pseudo code for implementing the look-up table shown in FIG. 8B;

FIGS. 10A to 10D are tables illustrating output of the first SBOX and the second SBOX shown in FIG. 7;

FIGS. 11A to 11D are tables illustrating output and hamming weight with respect to the first SBOX and the second SBOX shown in FIG. 7;

FIG. 12A is a table illustrating output the first SBOX and the second SBOX shown in FIG. 7;

FIG. 12B is a table illustrating output of the SBOX shown in FIG. 3;

FIG. 13 is a block diagram illustrating an endecryptor according to another embodiment of the inventive concept;

FIG. 14 is a block diagram illustrating an endecryptor according to still another embodiment of the inventive concept;

FIG. 15 is a table illustrating output and hamming weight with respect to a first SBOX and a second SBOX shown in FIG. 14;

FIG. 16 is a block diagram illustrating an endecryptor according to yet another embodiment of the inventive concept;

FIG. 17 is a table illustrating input and output of an SBOX shown in FIG. 16;

FIG. 18A is a block diagram illustrating an endecryptor according to yet another embodiment of the inventive concept;

DETAILED DESCRIPTION OF THE EMBODIMENTS

Figure 1:
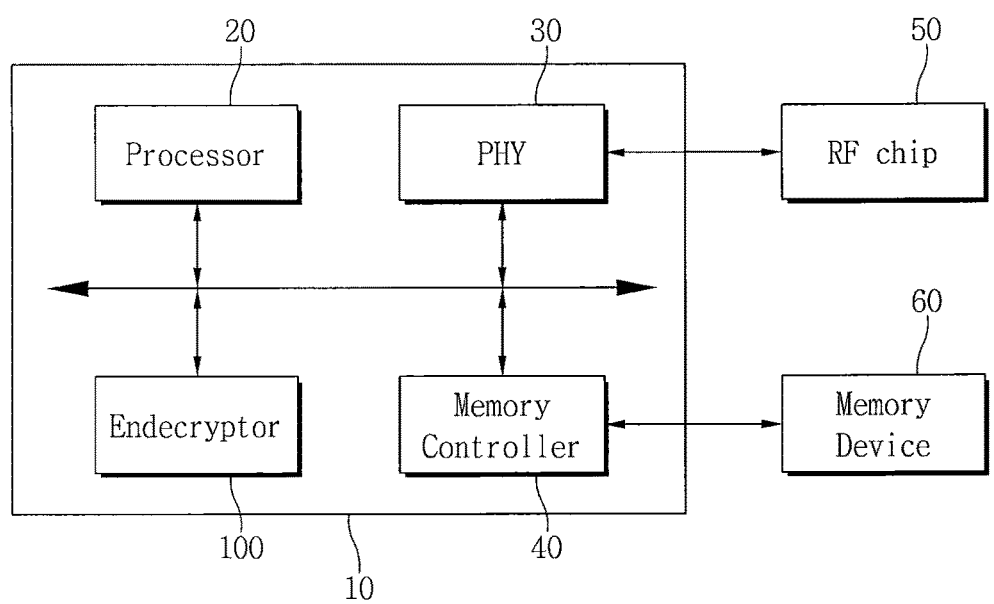
FIG. 1 is a block diagram illustrating a control device including an endecryptor according to an embodiment of the inventive concept.

Specific structural and functional details disclosed herein are merely representative for purposes of describing example embodiments of the present invention, however, example embodiments of the present invention may be embodied in many alternate forms and should not be construed as limited to example embodiments of the present invention set forth herein.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," etc. may be used herein to describe various components, these components should not be limited by these terms. These terms are only used to distinguish one component from another component. Thus, a first component discussed below could be termed a second component and the second component discussed below could be termed the first component without departing from the teachings of the present inventive concept.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and this specification and not in an idealized or overly formal sense unless expressly so defined herein.

Meanwhile, when it is possible to implement any embodiment in any other way, a function or an operation specified in a specific block may be performed differently from a flow specified in a flowchart. For example, consecutive two blocks may actually perform the function or the operation simultaneously, and the two blocks may perform the function or the operation conversely according to a related operation or function.

Embodiments of the present inventive concept will be described below with reference to accompanying drawings.

FIG. 1 is a block diagram illustrating a control device including an endecryptor according to some embodiments of the inventive concept.

Referring to FIG. 1, a control device 10 according to some embodiments of the inventive concept may control a smart card, a memory card, etc. In the embodiment, the control device 10 may include an application processor.

The control device 10 may include a processor 20, a physical layer (PHY) 30, a memory controller 40, and an endecryptor 100.

The processor 20 may communicate with a radio-frequency (RF) chip 50 through the PHY 30. Moreover, the processor 20 may perform a task and store the performed result to a memory device 60 according to control of the memory controller 40. In the embodiment, the processor 20 may include a plurality of cores.

The memory device 60 may store data, which is used in operation of the processor 20. The memory device 60 may be implemented by a dynamic random access memory (DRAM), a mobile DRAM, a static random access memory (SRAM), a phase change random access memory (PRAM), a ferroelectric random access memory (FRAM), a resistive random access memory (RRAM), and a magnetic random access memory (MRAM).

The endecryptor 100 according to some embodiments of the inventive concept may encrypt the received data. Further, the endecryptor 100 may decrypt the encrypted data.

Figures 5, 6, 7:
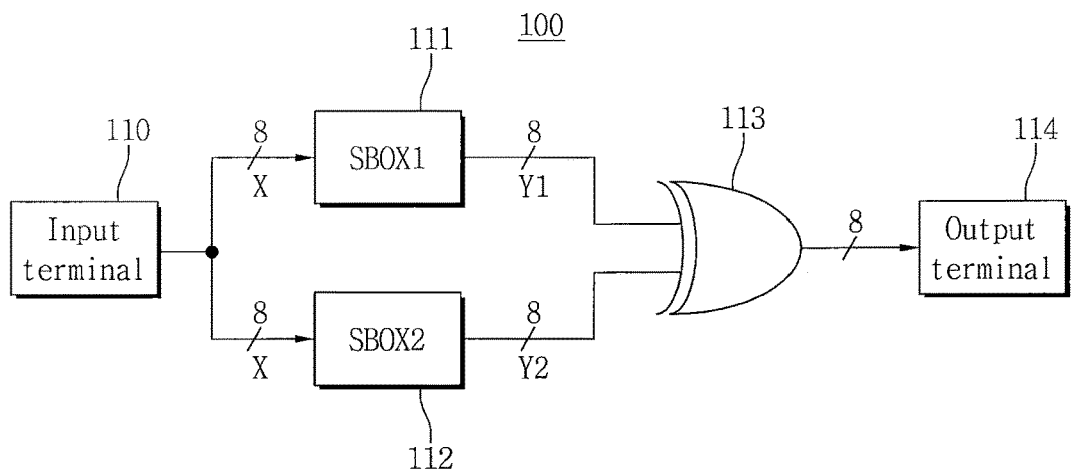
FIG. 5 shows pseudo code for implementing the look-up table shown in FIG. 4.
FIG. 6 is a table illustrating input and output of the SBOX shown in FIG. 3.
FIG. 7 is a block diagram illustrating the endecryptor shown in FIG. 1.

The endecryptor 100 according to some embodiments of the inventive concept may be described in FIG. 7 in detail.

Figure 2:
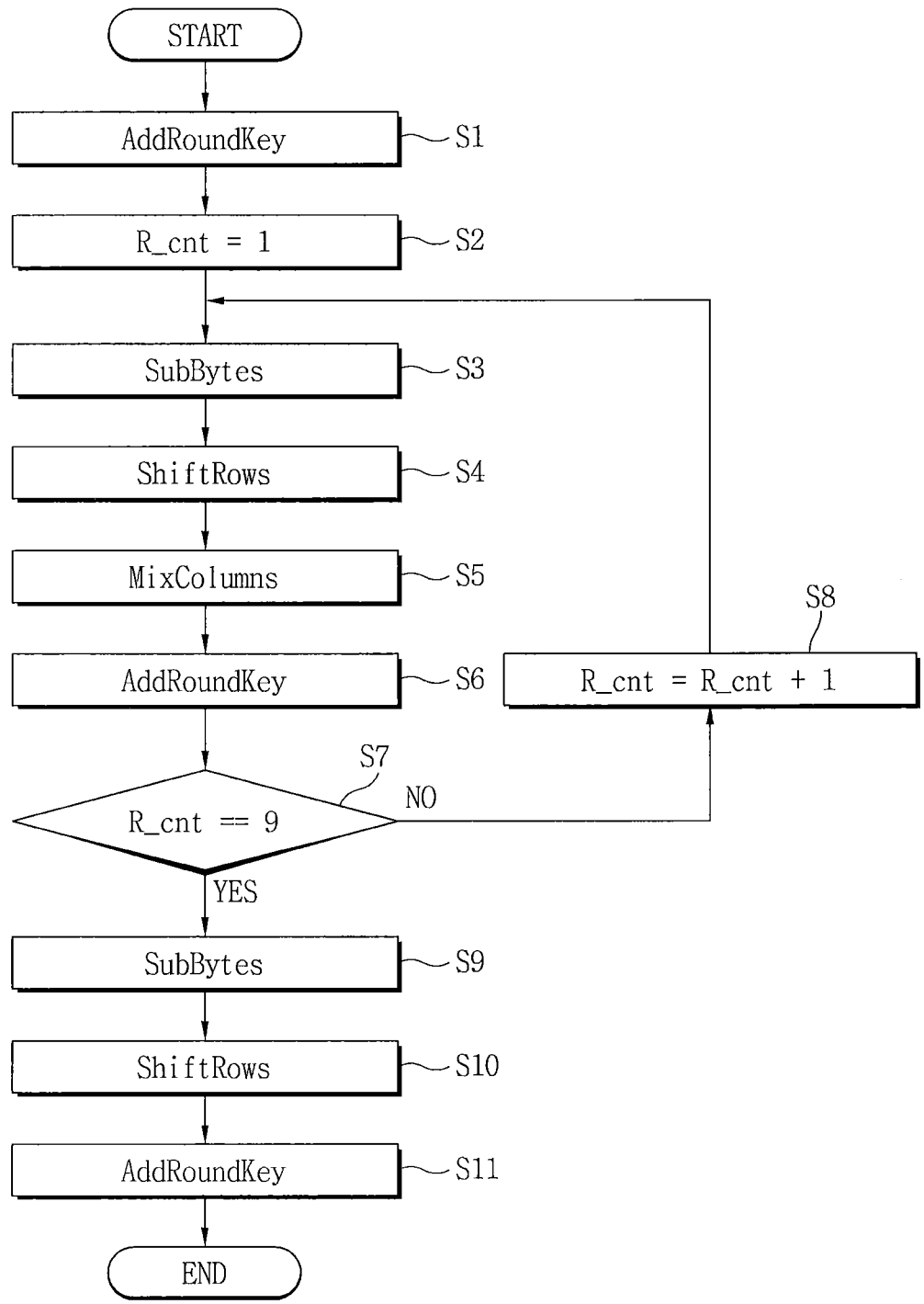
FIG. 2 is a flow chart illustrating an encryption operation of the endecryptor shown in FIG. 1.

FIG. 2 is a flow chart illustrating an encryption operation of the endecryptor shown in FIG. 1.

Referring to FIGS. 1 and 2, the endecryptor 100 may receive plain text (PT) data and output cipher text (CT) data. Moreover, the endecryptor 100 may receive the CT data and output the decrypted data.

Specifically, an encryption process by the endecryptor 100 may include an initial round, a middle round, and a final round.

For example, when the endecryptor 100 uses an advanced encryption standard (AES) algorithm, PT data has 128 bits and key data may be one of 128 bit data, 192 bit data, and 256 bit data. When the key data has 128 bits, the total rounds may be 10 rounds. Moreover, when the key data has 192 bits, the total rounds may be 12 rounds. Further, when the key data has 256 bits, the total rounds may be 14 rounds.

The endecryptor 100 may perform an SBOX function SubBytes, a row transformation function ShiftRows, a column transformation function MixColumns, and a round key transformation function AddRoundKey. When execution of each of four functions is complete, one round is complete.

Because all of four functions in a block encryption process are a bijection, four functions may have an inverse function. Accordingly, a block decryption process is to inversely perform the inverse function of the functions.

The initial round is the S1 operation. The initial round is performed once.

In the S1 operation, the endecryptor 100 performs a round key transformation function AddRoundKey. The round key transformation function AddRoundKey may perform an XOR operation with respect to a round key and data.

For example, the round key transformation function AddRoundKey may combine the PT data and an initial round key in an initial round. In the embodiment, the initial round key may be key data.

In the S2 operation, the endecryptor 100 may initialize a round counter R_cnt. For example, the endecryptor 100 may set the round counter R_cnt as 1.

The middle round is from the S3 operation to the S8 operation. When the key data is 128 bit, the middle round may be 9 rounds. Accordingly, the middle round may be repeated nine times.

In the S3 operation, the endecryptor 100 performs an SBOX function SubBytes. For example, in the case of an AES, the SBOX function may transform a PT data in units of bytes. In the embodiment, the S4 operation is performed and then the S3 operation may be performed.

The endecryptor 100 according to some embodiments of the inventive concept may perform a plurality of SBOX functions. The endecryptor 100 may perform a high-speed operation. Further, the endecryptor 100 may be implemented in a smaller area compared with an endecryptor according to a related art. The SBOX function according to the embodiment of the inventive concept may be described in FIGS. 7 to 9B in detail.

In the S4 operation, the endecryptor 100 may perform a row transformation function ShiftRows. That is, the endecryptor 100 may shift a result of the SBOX function in units of rows.

In the S5 operation, the endecryptor 100 may perform a column transformation function MixColumns. That is, the endecryptor 100 may transform a result of the column transformation function MixColumns based on a column.

In the S6 operation, the endecryptor 100 may perform a round key transformation function AddRoundKey. For example, when a round count R_cnt is 1, a round key transformation function AddRoundKey may perform an XOR operation using the first round key. When a round count R_cnt is 2, a round key transformation function AddRoundKey may perform an XOR operation using the second round key. The round key transformation function may combine a result of the column transformation function MixColumns with a round key.

In the S7 operation, the endecryptor 100 may determine a round count R_cnt. When the round count R_cnt is 9, the endecryptor 100 perform the final round. If not, the endecryptor 100 performs the S8 operation.

In the S8 operation, the endecryptor 100 may increase the round count R_cnt by 1 and return to perform the S3 operation.

The final round is from the S9 to the S11 operation. The column transformation function MixColumns may not be performed in the final round.

In the S9 operation, the endecryptor 100 may perform the SBOX function SubBytes.

In the S10 operation, the endecryptor 100 performs a row transformation function ShiftRows. In some embodiments, the S10 operation is performed and then the S9 operation may be performed.

In the S11 operation, the endecryptor 100 may perform a round key transformation function AddRoundKey.

Figures 3, 4:
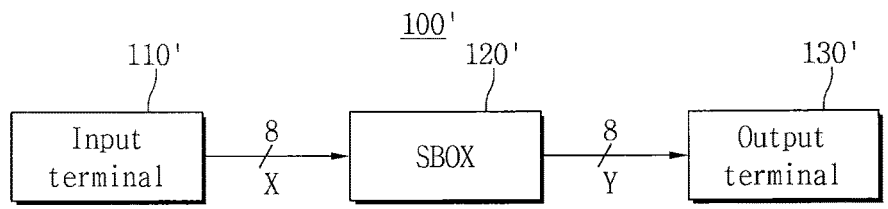
FIG. 3 is a block diagram illustrating an endecryptor according to a related art.
FIG. 4 is a table illustrating a look-up table included in an SBOX shown in FIG. 3.

FIG. 3 is a block diagram illustrating an endecryptor according to a related art.

Referring to FIG. 3, an endecryptor 100' according to the related art includes only an SBOX 120'. The endecryptor 100' according to the related art may include an SBOX capable of performing an inverse transformation so that an encryption text has a non-linear characteristic.

Specifically, the endecryptor 100' may include an input terminal 110', an SBOX 120', and an output terminal 130'. The input terminal 110' may receive input data X where a PT data and a round key are combined. The SBOX 120' may replace data in units of 8 bits.

For example, the SBOX 120' may replace the input data X of 8 bits with substitution data Y having a different value. The output terminal 130' may output the substitution data Y of 8 bits.

In some embodiments, the SBOX 120' may be embodied in a look-up table. The SBOX 120' may be described in FIGS. 4 and 5 in detail.

FIG. 4 is a table illustrating a look-up table included in an SBOX shown in FIG. 3.

FIG. 4 shows an AES SBOX in an AES standard documentation. The SBOX 120' may be embodied in a look-up table LUT. In the embodiment, the look-up table LUT may map in 1:1 with 8 bit data.

For example, a substitution value of 95 may be substituted using the look-up table LUT. That is, when inputting 9 to the X-axis and 5 to the Y-axis into the look-up table LUT, $2a$ is obtained as a result.

Further, the look-up table LUT may be set to perform an inverse transformation in units of bytes.

FIG. 5 shows pseudo code for implementing the look-up table shown in FIG. 4.

Referring to FIGS. 4 and 5, the look-up table LUT may be stored in a volatile memory device, such as a read only memory (ROM) or a flash memory device.

Moreover, the look-up table LUT may be embodied in a logic circuit using pseudo-code described in FIG. 5. For example, the pseudo-code may be embodied in a logic circuit using Verilog™ hardware description language (HDL).

FIG. 6 is a table illustrating input and output of the SBOX shown in FIG. 3.

Referring to FIGS. 3 and 6, when receiving input data of 2 bit, an SBOX 120' may output substitution data Y of 2 bit.

For example, when receiving "00", the SBOX 120' may output "11". When receiving "01", the SBOX 120' may output "00". When receiving "10", the SBOX 120' may output "01". When receiving "11", the SBOX 120' may output "10".

Hamming weight HW denotes the number of "1s" included in data. For example, when an output of the SBOX120' is "11", the hamming weight HW is 2. When an output of the SBOX120' is "00", the hamming weight HW is 0. When an output of the SBOX120' is "01", the hamming weight HW is 1. When an output of the SBOX120' is "10", the hamming weight HW is 1.

FIG. 7 is a block diagram illustrating the endecryptor shown in FIG. 1.

Referring to FIGS. 1 and 7, an endecryptor 100 according to some embodiments of the inventive concept may include at least two SBOXs. Specifically, the endecryptor 100 may include an input terminal 110, a first SBOX 111, a second SBOX 112, an XOR gate 113, and an output terminal 114.

The input terminal 110 transmits input data X to the first SBOX 111 and the second SBOX 112. For example, the input terminal 110 may receive input data X where PT data and a round key are combined.

In some embodiments, the input terminal 110 may include a pre-charge logic circuit where an amount of current is uniformly maintained. The pre-charge logic may initialize an input value and an output value. Accordingly, the pre-charge logic may control the endecryptor 100 to consume current uniformly regardless of an input value of the first SBOX 111 or the second SBOX 112.

Each of the first SBOX 111 and the second SBOX 112 may perform an SBOX function. The first SBOX 111 may replace input data X with first substitution data Y1. The second SBOX 112 may replace the input data X with second substitution data Y2. In some embodiments, each of the first substitution data Y1 and the second substitution data Y2 may be set to be different from each other.

For example, when the endecryptor 100 supports AES, each of the first SBOX 111 and the second SBOX 112 may replace data in units of 8 bits. That is, the first SBOX 111 may replace input data X of 8 bits with the first substitution data Y1. The second SBOX 112 may replace input data X of 8 bits with the second substitution data Y2.

In some embodiments, each of the first and second SBOXs 111 and 112 may be embodied in one look-up table. The first SBOX 111 may be described in FIGS. 8A and 9A in detail. The second SBOX 112 may be described in FIGS. 8B and 9B in detail.

A pre-charge voltage may be applied in an input terminal of each of the first SBOX 111 and the second SBOX 112. Accordingly, when the same input data is successively input, change of an amount of current of each of the first SBOX 111 or the second SBOX 112 may be reduced or minimized.

The XOR gate 113 may perform an XOR operation with respect to an operation result of each of the first SBOX 111 and the second SBOX 112. The output terminal 114 may output the result where the XOR operation is performed. The result from the XOR operation that is performed is set to be equal to the replaced result of the SBOX 120' shown in FIG. 3.

Further, the endecryptor 100 may include an AND gate instead of the XOR gate 113. Here, a result from that the AND operation is performed is set to be equal to the replaced result of the SBOX 120' shown in FIG. 3.

In some embodiments, the XOR gate 113 may be replaced with one of an AND gate, an OR gate, an XNOR gate, a NOR gate, a NAND gate, a BUFFER gate, an INVERTER gate.

That is, the XOR gate 113 may be replaced with one of an AND operation, an OR operation, an XNOR operation, a NOR operation, a NAND operation, a BUFFER operation, an INVERTER operation.

Further, the XOR gate 113 may be replaced with the gate, which is combined with at least two gates of an AND gate, an OR gate, an XNOR gate, a NOR gate, a NAND gate, a BUFFER gate, and an INVERTER gate.

The endecryptor 100 according to some embodiments of the inventive concept may change any existing hamming weight. Accordingly, an attacker may be difficult to find out a used key.

FIG. 8A is a table illustrating a look-up table included in a first SBOX shown in FIG. 7.

Referring to FIGS. 7 and 8A, the first SBOX 111 may be embodied in the first look-up table LUT1. In the embodiment, the first look-up table LUT1 may map in 16:1 with 8 bit data. For example, 256 pieces of input data may be mapped to 16 kinds of output data based on the first look-up table LUT1.

For example, a substitution value of 95 may be replaced using the first look-up table LUT1. That is, when inputting 9 to X-axis and 5 to Y-axis to first the look-up table LUT1, 59 is obtained as a result.

FIG. 8B is a table illustrating a look-up table included in a second SBOX 112 shown in FIG. 7.

Referring to FIGS. 7 and 8B, the second SBOX 112 may be embodied in the second look-up table LUT2. In the embodiment, the second look-up table LUT2 may map in 16.1 with 8 bit data. For example, 256 pieces of input data may be mapped to 16 kinds of output data based on the first look-up table LUT2.

For example, a substitution value of 95 may be replaced using the second look-up table LUT2. That is, when inputting 9 to X-axis and 5 to Y-axis to the second look-up table LUT2, 73 is obtained as a result.

FIG. 9A shows pseudo code for implementing the look-up table shown in FIG. 8A. FIG. 9B shows pseudo code for implementing the look-up table shown in FIG. 8B.

Referring to FIGS. 8A and 9B, each of the first look-up table LUT1 and the second look-up table LUT2 may be stored in a volatile memory device such as a ROM or a flash memory device.

Moreover, the first look-up table LUT1 may be described with pseudo-code shown in FIG. 8A. For example, the pseudo-code may be implemented with a logic circuit using Verilog™ hardware description language (HDL). Likewise, the second look-up table LUT2 may be described with pseudo-code shown in FIG. 8B.

FIGS. 10A to 10D are tables illustrating output of the first SBOX and the second SBOX shown in FIG. 7.

Referring to FIGS. 7 to 10D, the endecryptor 100 according to some embodiments of the inventive concept may receive input data X of 8 bits. However, for convenience of description, it assumes that the endecryptor 100 receives input data X of 2 bits.

The first SBOX 111 outputs the first substitution data Y1 of 2 bits and the second SBOX 112 outputs the second substitution data Y2 of 2 bits.

For example, FIG. 10A shows the first embodiment of the first SBOX 111 and the second SBOX 112. FIG. 10B shows the second embodiment of the first SBOX 111 and the second SBOX 112. FIG. 10C shows the third embodiment of the first SBOX 111 and the second SBOX 112. Finally, FIG. 10D shows the fourth embodiment of the first SBOX 111 and the second SBOX 112.

The XOR gate 113 may perform an XOR operation with respect to an output Y1 of the first SBOX 111 and an output Y2 of the second SBOX 112.

A result Y1 XOR Y2 of the XOR gate 113 according to the first to fourth embodiments of the inventive concept is identical.

FIGS. 11A to 11D are tables illustrating output and hamming weight with respect to the first SBOX and the second SBOX shown in FIG. 7.

Referring to FIGS. 11A to 11D, when receiving input data X of 2 bits, the first SBOX 111 may output the first substitution data Y1 of 2 bits. When receiving input data X of 2 bits, the second SBOX 112 may output the second substitution data Y2 of 2 bits.

For example, FIG. 11A is the first embodiment illustrating output and hamming weight with respect to the first SBOX 111 and the second SBOX 112. FIG. 11B is the second embodiment illustrating output and hamming weight with respect to the first SBOX 111 and the second SBOX 112. FIG. 11C is the third embodiment illustrating output and hamming weight with respect to the first SBOX 111 and the second SBOX 112. FIG. 11D is the fourth embodiment illustrating output and hamming weight with respect to the first SBOX 111 and the second SBOX 112.

Compared with the first to fourth embodiments, the first SBOX 111 and the second SBOX 112 appear different from each other. Accordingly, existing hamming weight information (i.e., in the case of an endecryptor including one SBOX) may be changed.

FIG. 12A is a table illustrating output the first SBOX 111 and the second SBOX 112 shown in FIG. 7.

Referring to FIGS. 7 and 12A, the input terminal 110 transmits input data X to the first SBOX 111 and the second SBOX 112.

The first SBOX 111 may replace the input data X with the first substitution data Y1. The second SBOX 112 may replace the input data X with the second substitution data Y2.

When the number of the input data X is N and the number of the first substitution data Y1 is M, the first SBOX 111 replaces one of the N number of the input data X with one of the M number of the first substitution data Y1. Likewise, when the number of the input data X is N and the number of the second substitution data Y2 is M, the second SBOX 112 replaces one of the N number of the input data X with one of the M number of the second substitution data Y2. In some embodiments, N may be a natural number greater than M.

For example, the first SBOX 111 may replace the input data X with one of 3, 5, 6, and 9. The second SBOX 112 may replace the input data X with one of 3, 7, A, and E.

Each of the first SBOX 111 and the second SBOX 112 may replace the input data X in N:1. For example, each of the first SBOX 111 and the second SBOX 112 may replace the 16 number of input data X with one of the four number of substitution data.

Further, a summation of hamming weight HW(Y1) of the first substitution data Y1 and hamming weight HW(Y2) of the second substitution data Y2 may be the same.

Further, a summation of hamming weight HW(Y1) of the first substitution data Y1 and hamming weight HW(Y2) of the second substitution data Y2 may have a minimum difference.

For example, when the first substitution data Y1 is 3 (i.e., "0011" as a hexa code) and the second substitution data Y2 is 3, a summation HW(Y1)+HW(Y2) of hamming weight HW(Y1) of the first substitution data Y1 and hamming weight HW(Y2) of the second substitution data Y2 is 4.

Moreover, when the first substitution data Y1 is 6 (i.e., "0110" as a hexa code) and the second substitution data Y2 is 7 (i.e., "0111" as a hexa code), a summation HW(Y1)+HW(Y2) of hamming weight HW(Y1) of the first substitution data Y1 and hamming weight HW(Y2) of the second substitution data Y2 is 5.

Moreover, when the first substitution data Y1 is 5 (i.e., "0101" as a hexa code) and the second substitution data Y2 is 7 (i.e., "0111" as a hexa code), a summation HW(Y1)+HW(Y2) of hamming weight HW(Y1) of the first substitution data Y1 and a hamming weight HW(Y2) of the second substitution data Y2 is 5.

FIG. 12B is a table illustrating output of the SBOX shown in FIG. 3.

Each of the first SBOX 111 and the second SBOX 112 shown in FIG. 7 may replace input data X in N:1. On the other hand, the SBOX 120' shown in FIG. 3 may replace input data X in 1:1.

Referring to FIGS. 3, 12A and 12B, an input terminal 110' transmits input data X to the SBOX 120'. The SBOX 120' may replace the input data X with a substitution data Y.

For example, when the number of the input data X is N and the number of the substitution data Y is N, the SBOX 120' may replace one of the N number of the input data X with one of the N number of the substitution data Y. That is, the SBOX 120' may replace the input data X in 1:1.

An endecryptor includes an endecryptor for transformation and an endecryptor for an attack defense. In a related art, the endecryptor for an attack defense may be implemented using a dual-rail and a decode permutation encoder. The endecryptor for an attack defense may be implemented in a twice or three times larger area than the endecryptor for transformation.

For example, the endecryptor 100' according to a related art is for transformation. On the other hand, the endecryptor 100 according to the embodiment of the inventive concept is for an attack defense.

FIG. 13 is a block diagram illustrating an endecryptor according to further embodiments of the inventive concept.

Referring to FIG. 13, an endecryptor 200 according to some embodiments of the inventive concept may include at least two SBOXs.

Specifically, the endecryptor 200 may include an input terminal 210, a first SBOX 211, a second SBOX 212, a first output terminal 213, and a second output terminal 214.

The input terminal 210 may receive input data X. For example, the input terminal 210 may receive data where PT data and a round key are combined.

Each of the first SBOX 211 and the second SBOX 212 may perform an SBOX function. Each of the first SBOX 211 and the second SBOX 212 may replace data in units of 8 bits.

For example, the first SBOX 211 may replace input data X of 8 bits with the first substitution data Y1. The second SBOX 212 may replace input data X of 8 bits with the second substitution data Y2.

In some embodiments, each of the first SBOX 211 and the second SBOX 212 may be embodied in one look-up table.

The first output terminal 213 receives the first substitution data Y1 of 8 bits from the first SBOX 211. The first output terminal 213 may receive the first substitution data Y1 of 8 bits four times and generate the first substitution data Y1 of 32 bits.

Likewise, the second output terminal 214 receives the second substitution data Y2 of 8 bits from the second SBOX 212. The second output terminal 214 may receive the second substitution data Y2 of 8 bits four times and generate the second substitution data Y2 of 32 bits.

Moreover, the endecryptor 200 may further include a first MixColumn 215 and a second MixColumn 216.

The first output terminal 213 transmits the first substitution data Y1 of 32 bits to the first MixColumn 215. The second output terminal 214 transmits the second substitution data Y2 of 32 bits to the second MixColumn 216.

Each of the first MixColumn 215 and the second MixColumn 216 may perform a column transformation function.

The first MixColumn 215 may transform the first substitution data Y1 based on a column. Likewise, the second MixColumn 216 may transform the second substitution data Y2 based on a column.

In the embodiment, the first SBOX 211 may include the first SBOX 111 shown in FIG. 7. Further, the second SBOX 212 may include the second SBOX 112 shown in FIG. 7.

FIG. 14 is a block diagram illustrating an endecryptor according to still further embodiments of the inventive concept.

Referring to FIG. 14, an endecryptor 310 according to some embodiments of the inventive concept may include at least two SBOXs.

Specifically, the endecryptor 310 may include an input terminal 311, a first SBOX 312, a first output terminal 313, a second SBOX 314, and a second output terminal 315.

The input terminal 311 may receive input data X. For example, the input data X may be data where PT data and a round key are combined. Each of the first SBOX 312 and the second SBOX 314 may perform an SBOX function. Each of the first SBOX 312 and the second SBOX 314 may replace data in units of 8 bits.

For example, the first SBOX 312 may replace input data X of 8 bits with the first substitution data Y1. The second SBOX 314 may replace input data X of 8 bits with the second substitution data Y2.

In some embodiments, each of the first SBOX 312 and the second SBOX 314 may be embodied in one look-up table.

Each of the first SBOX 312 and the second SBOX 314 may adjust the hamming weight of each of the first SBOX 312 and the second SBOX 314 using a dummy bit. Further, each of the first SBOX 312 and the second SBOX 314 may add the dummy bit and uniformly maintain the hamming weight.

The first SBOX 312 and the second SBOX 314 may be described in FIG. 15 in detail.

FIG. 15 is a table illustrating output and hamming weight with respect to a first SBOX and a second SBOX shown in FIG. 14.

Referring to FIGS. 14 and 15, the input terminal 311 transmits input data X to the first SBOX 312 and the second SBOX 314. The first SBOX 312 may replace input data X with the first substitution data Y1. The second SBOX 314 may replace the input data X with the second substitution data Y2.

For example, the first SBOX 312 may receive input data X of 2 bits and output the first substitution data Y1 of 3 bits. Likewise, the second SBOX 314 may receive input data X of 2 bits and output the second substitution data Y2 of 3 bits. That is, each of the first SBOX 312 and the second SBOX 314 may include a dummy bit.

Each of the first SBOX 312 and the second SBOX 314 may adjust the hamming weight of each of the first SBOX 312 and the second SBOX 314 using a dummy bit. For example, each of the first SBOX 312 and the second SBOX 314 may add the dummy bit and uniformly maintain a summation of the hamming weight with respect to output of each of the first SBOX 312 and the second SBOX 314.

FIG. 16 is a block diagram illustrating an endecryptor according to yet further embodiments of the inventive concept.

Referring to FIG. 16, an endecryptor 320 may include an input terminal 321, at least one SBOX 322 to replace input data X with substitution data Y, and an output terminal 323 for the substitution data Y.

In the embodiment, the substitution data Y may include a dummy bit for adjusting hamming weight. The SBOX 322 may adjust hamming weight of the substitution data Y using the dummy bit.

It assumes that the SBOX 322 replaces input data X in units of 2 bits. For example, the SBOX 322 may replace the input data X of 2 bits with the substitution data Y of 4 bits. The output terminal 323 may output the substitution data Y of 4 bits.

FIG. 17 is a table illustrating input and output of an SBOX shown in FIG. 16.

Referring to FIGS. 16 and 17, when receiving input data X of 2 bit, an SBOX 322 may output substitution data Y of 4 bit.

For example, when receiving "00", the SBOX 322 may output "1100". When receiving "01", the SBOX 322 may output "0110". When receiving "10", the SBOX 322 may output "1001". When receiving "11", the SBOX 322 may output "0011". All of the hamming weights of the substitution data Y are 2.

FIG. 18A is a block diagram illustrating an endecryptor according to yet further embodiments of the inventive concept.

Referring to FIG. 18A, an endecryptor 330 may include an input terminal 331, a first SBOX 332_1, a second SBOX 332_2, a third SBOX 332_3, a fourth SBOX 332_4, a first XOR 333_1, a second XOR 333_2, and an output terminal 334.

The first SBOX 332_1 may replace first input data X1 with the first substitution data Y1. The second SBOX 332_2 may replace the first input data X1 with the second substitution data Y2. The third SBOX 332_3 may replace second input data X2 with the third substitution data Y3. Moreover, the fourth SBOX 332_4 may replace the second input data X2 with the fourth substitution data Y4. The output terminal 334 may output the encrypted or decrypted output data based on the first to fourth substitution data Y1 to Y4.

When the endecryptor 330 supports AES, the endecryptor 330 may output data of 128 bits in every round. Accordingly, the endecryptor 330 is performed eight times in every round. The output terminal 334 may store a result, which is performed eight times. Each of the first to fourth SBOXs 332_1 to 332_4 may include different configurations.

Figure 18B:
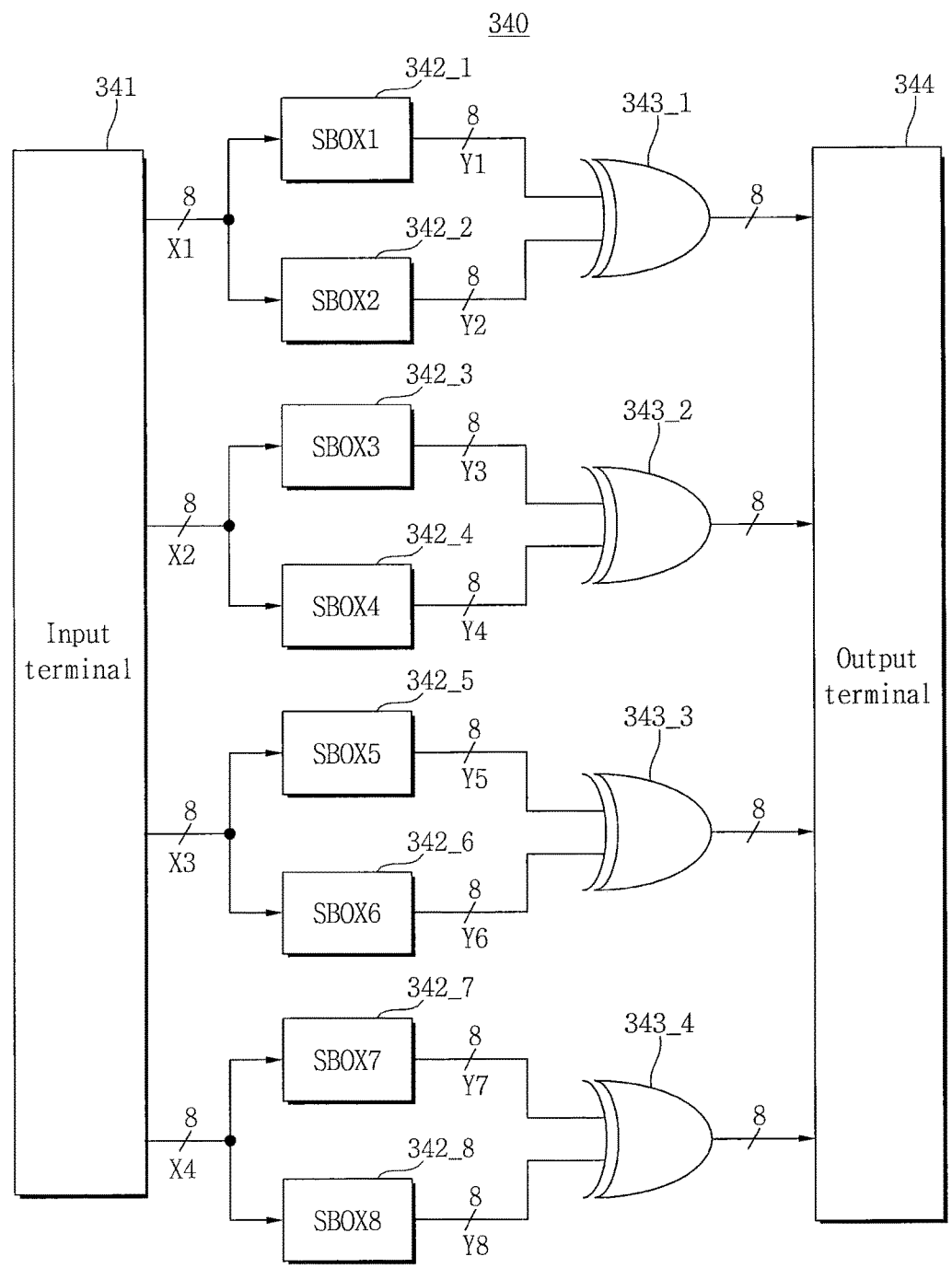
FIG. 18B is a block diagram illustrating an endecryptor according to yet another embodiment of the inventive concept.

FIG. 18B is a block diagram illustrating an endecryptor according to yet further embodiments of the inventive concept.

Referring to FIG. 18B, an endecryptor 340 may include an input terminal 341, a first SBOX 342_1, a second SBOX 342_2, a third SBOX 342_3, a fourth SBOX 342_4, a fifth SBOX 342_5, a sixth SBOX 342_6, a seventh SBOX 342_7, a eighth SBOX 342_8, a first XOR 343_1, a second XOR 343_2, a third XOR 343_3, a fourth XOR 343_4, and an output terminal 344.

The first SBOX 342_1 may replace first input data X1 with the first substitution data Y1. The second SBOX 342_2 may replace the first input data X1 with the second substitution data Y2. The third SBOX 342_3 may replace second input data X2 with the third substitution data Y3. The fourth SBOX 342_4 may replace the second input data X2 with the fourth substitution data Y4.

The fifth SBOX 342_5 may replace third input data X3 with the fifth substitution data Y5. The sixth SBOX 342_6 may replace the third input data X3 with the sixth substitution data Y6. The seventh SBOX 342_7 may replace fourth input data X4 with the seventh substitution data Y7. The eight SBOX 342_8 may replace the fourth input data X4 with the eighth substitution data Y8.

The output terminal 344 may output the encrypted or decrypted output data based on the first to eighth substitution data Y1 to Y8.

When the endecryptor 340 supports AES, the endecryptor 340 may output data of 128 bits in every round. Accordingly, the endecryptor 340 is performed four times in every round. The output terminal 334 may store a result which is performed four times.

For example, the first SBOX 342_1, the third SBOX 342_3, and the fifth SBOX 342_5 include the same configuration. However, the seventh SBOX 342_7 may be different from the first SBOX 342_1, the third SBOX 342_3, and the fifth SBOX 342_5.

Further, the second SBOX 342_2, the fourth SBOX 342_4, and the sixth SBOX 342_6 include the same configuration. However, the eighth SBOX 342_8 may be different from second SBOX 342_2, the fourth SBOX 342_4, and the sixth SBOX 342_6.

Figure 19:
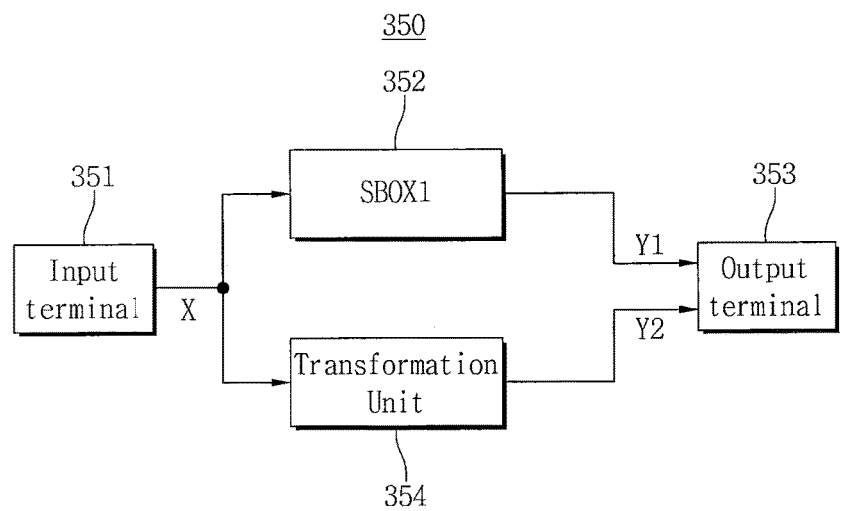
FIG. 19 is a block diagram illustrating an endecryptor according to yet another embodiment of the inventive concept.

FIG. 19 is a block diagram illustrating an endecryptor according to yet further embodiments of the inventive concept.

Referring to FIG. 19, an endecryptor 350 may include an input terminal 351, a first SBOX 352, an output terminal 353, and a transformation unit 354.

The input terminal 351 transmits input data X to the first SBOX 352 and the transformation unit 354. In the embodiment, the input terminal 351 may include a pre-charge logic circuit.

The first SBOX 352 may replace input data X with a first substitution data Y1. The transformation unit 354 may replace the input data X with a second substitution data Y2.

The transformation unit 354 may output a dummy bit for adjusting the hamming weight of the second substitution data Y2. The transformation unit 354 may include a second SBOX for replacing the input data X with the second substitution data Y2.

The output terminal 353 may output encrypted or decrypted output data based on the first and second substitution data Y1 and Y2. That is, the output terminal 353 may perform a logic operation with respect to the first and second substitution data Y1 and Y2 and generate the output data.

In some embodiments, the endecryptor 350 may transform the first and second substitution data Y1 and Y2 into encrypted data according to a block encryption algorithm.

Figure 20:
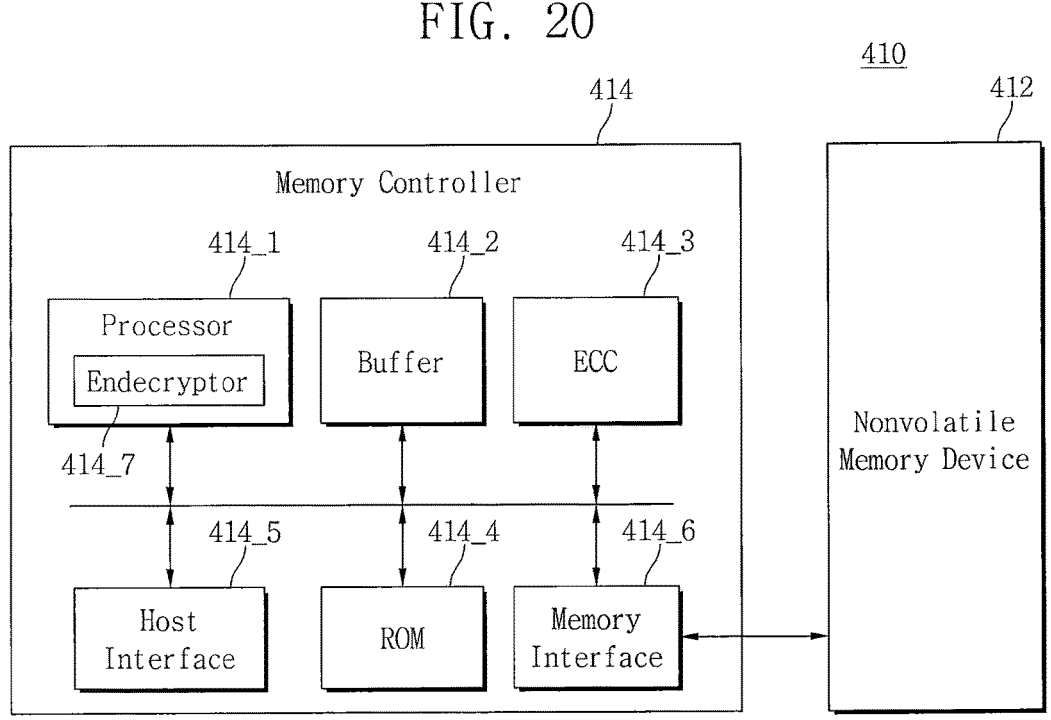
FIG. 20 is a block diagram illustrating a memory system according to a first embodiment of the inventive concept.

FIG. 20 is a block diagram illustrating a memory system according to a first embodiment of the inventive concept.

Referring to FIG. 20, a memory system 410 may include a nonvolatile memory device 412 and a memory controller 414.

The nonvolatile memory device 412 may include a NAND flash memory device, a NOR flash memory device, a resistive random access memory (RRAM), a phase-change random access memory (PRAM), a magnetroresistive random access memory (MRAM), a ferroelectric random access memory (FRAM), and a spin transfer torque random access memory (STT-RAM).

The memory controller 414 may control the nonvolatile memory device 412 according to a request of an external device (e.g., a host). For example, the memory controller 414 may be implemented to control read, write, and remove operations of the nonvolatile memory device 412.

The memory controller 414 may provide an interface between the nonvolatile memory device 412 and a host. The memory controller 414 may be implemented to drive firmware for controlling the nonvolatile memory device 412. The memory controller 414 may include a processor 414_1, a buffer 414_2, an error correction circuit 414_3, a ROM 414_4, a host interface 414_5, and a memory interface 414_6.

The processor 414_1 may control overall operations of the memory controller 414. The processor 414_1 according to some embodiments of the inventive concept may include an endecryptor 414_7. In some embodiments, the endecryptor 414_7 may include the endecryptor 100 shown in FIG. 7.

The buffer 414_2 may be used as an operating memory of the processor 414_1. When the host requests a write operation, data input from the host may be temporarily stored in the buffer 414_2. Further, when the host requests a read operation, data read from the nonvolatile memory device 412 may be temporarily stored in the buffer 414_2.

When the host requests a write operation, the error correction circuit 414_3 may decode data stored in the buffer 414_2 using an error correction code. Here, the decoded data and the used error correction code may be stored in the nonvolatile memory device 412.

Meanwhile, when the host requests a read operation, the error correction circuit 414_3 may recover data read from the nonvolatile memory device 412 using the error correction code. Here, the error correction code may be included in the data. The ROM 414_4 may store data for driving the memory controller 414.

The host interface 414_5 may include a protocol for performing data exchange between the host and the memory controller 414. For example, the memory controller 414 may communicate with the host through one of a Universal Serial Bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol.

The memory interface 414_6 may provide an interface between the nonvolatile memory device 412 and the memory controller 414.

The endecryptor 414_7 shown in FIG. 20 may be implemented to be included in the processor 414_1 but the inventive concept is not limited thereto. The endecryptor according to some embodiments of the inventive concept may be implemented with a separate processor.

Figure 21:
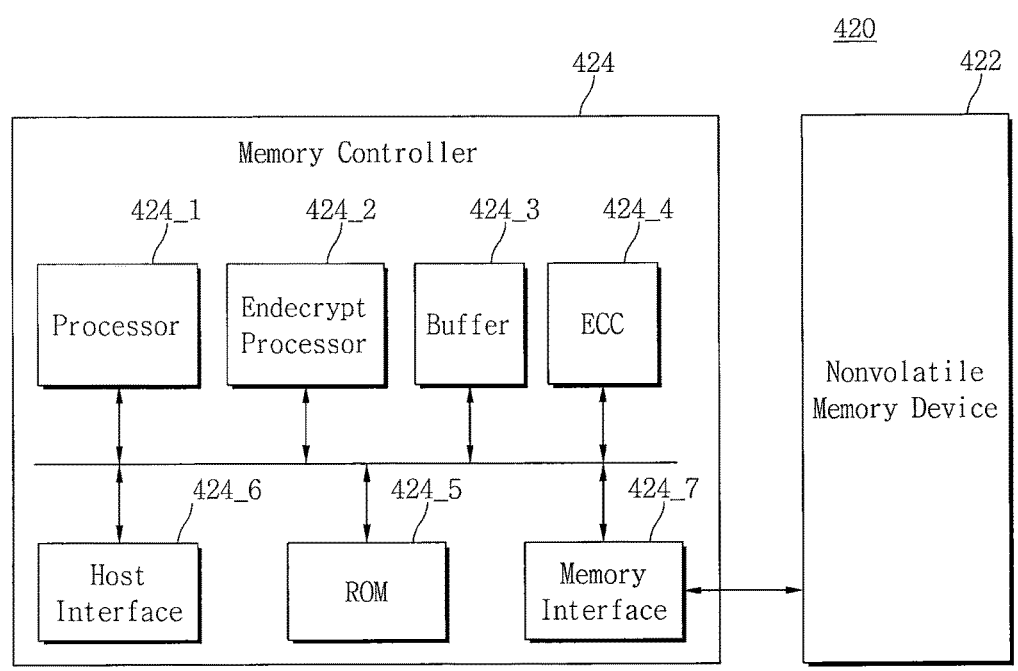
FIG. 21 is a block diagram illustrating a memory system according to a second embodiment of the inventive concept.

FIG. 21 is a block diagram illustrating a memory system according to a second embodiment of the inventive concept.

Referring to FIG. 21, the memory system 420 may include a nonvolatile memory device 422 and a memory controller 424.

The memory controller 424 according to some embodiments of the inventive concept may include a processor 424_1, an encryption and decryption processor 424_2, a buffer 424_3, an error correction code (ECC) 414_4, a ROM 424_5, a host interface 424_6, and a memory interface 424_7.

In some embodiments, the encryption and decryption processor 424_2 may include the endecryptor 100 shown in FIG. 7.

Figure 22:
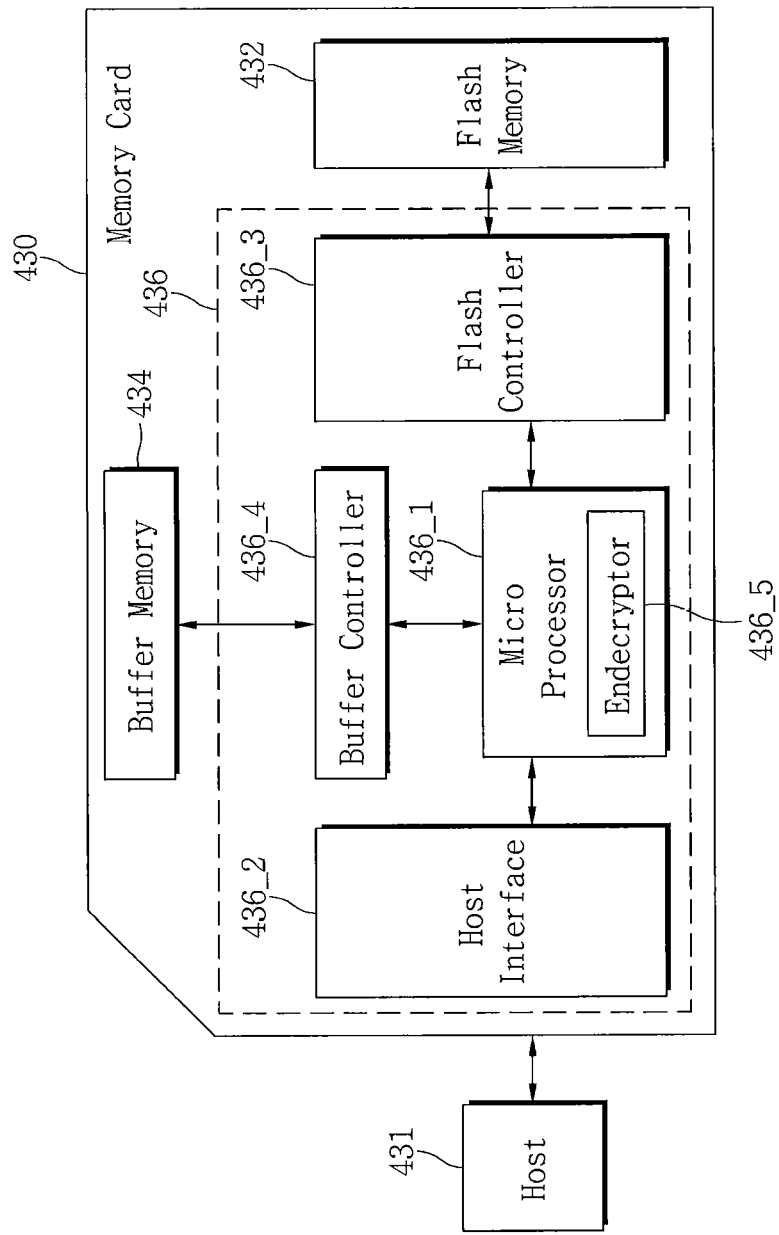
FIG. 22 is a block diagram with respect to a memory card according to an embodiment of the inventive concept.

FIG. 22 is a block diagram with respect to a memory card according to some embodiments of the inventive concept.

Referring to FIG. 22, the memory card 430 may include a flash memory 432, a buffer memory 434, and a memory controller 436 for controlling the flash memory 432 and the buffer memory 434.

The flash memory 432 may be a NAND flash memory or a NOR flash memory. The buffer memory 434 is a device for temporarily storing data generated during operation of the memory card 430. The buffer memory 434 may be embodied in a DRAM or an SRAM.

The memory controller 436 may be connected between a host 431 and the flash memory 432. In response to a request of the host 431, the memory controller 436 may be implemented to access the flash memory 432.

The memory controller 436 may include the microprocessor 436_1, a host interface 436_2, a flash controller 436_3, and a buffer controller 436_4. The memory controller 436 may be implemented to drive firmware for controlling the flash memory 432.

The microprocessor 436_1 may include an endecryptor 436_5. In some embodiments, the endecryptor 436_5 may include the endecryptor 100 shown in FIG. 7.

The host interface 436_2 may provide an interface with the host 431 through a card protocol (e.g., MMC) for performing data exchange between the host 431 and the memory controllers 436_3 and 436_4. Memory card 430 may be applied to a multimedia card (MMC), a security digital (SD), a miniSD, a memory stick, a smartmedia, a transflash card, etc.

Figure 23:
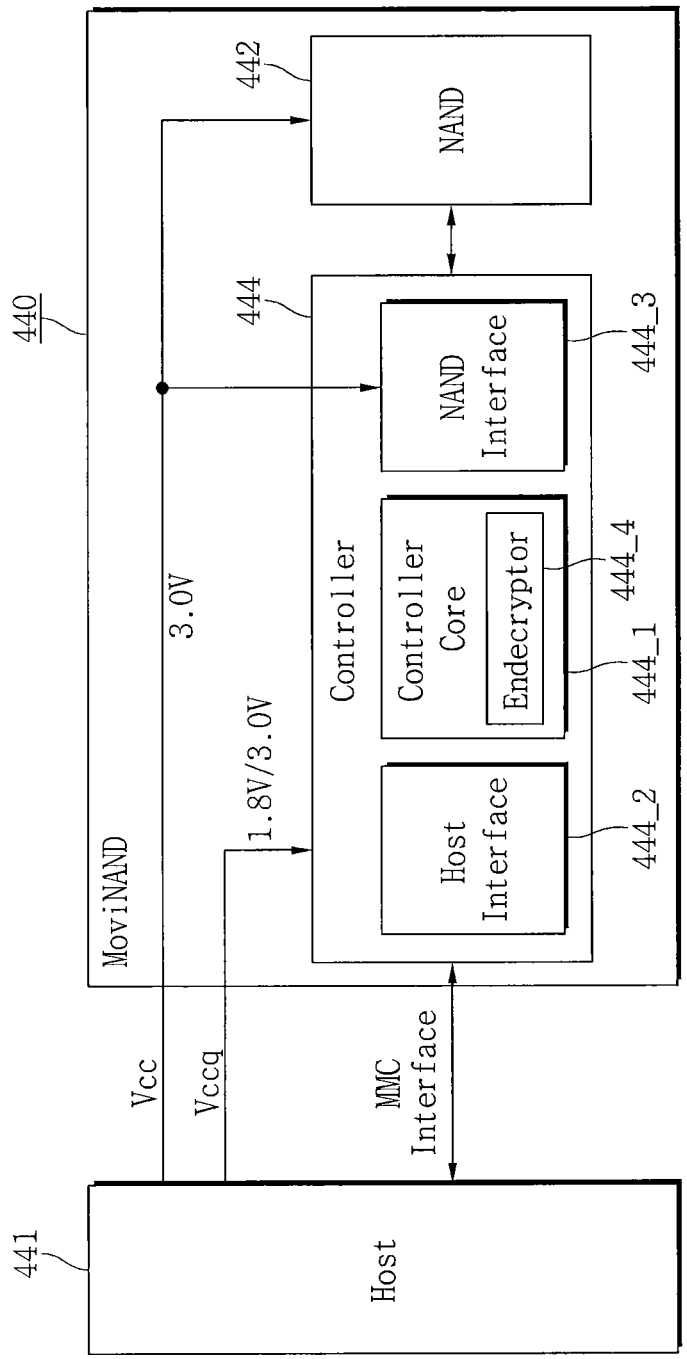
FIG. 23 is a block diagram illustrating a MoviNAND according to an embodiment of the inventive concept.

FIG. 23 is a block diagram illustrating a MoviNAND according to some embodiments of the inventive concept.

Referring to FIG. 23, the MoviNAND 440 may include a NAND flash memory device 442 and a controller 444.

The NAND flash memory device 442 may be implemented by stacking NAND flash memories in a single package (e.g., fine-pitch ball grid array (FBGA)).

The controller 444 may include a controller core 444_1, a host interface 444_2, and a NAND interface 444_3. The controller core 444_1 may control overall operations of the MoviNAND 440. The controller core 444_1 may include an endecryptor 444_4. In some embodiments, the endecryptor 444_4 may include the endecryptor 100 shown in FIG. 7.

The host interface 444_2 may interface the host 441 with the controller 444 through a multimedia card interface. The NAND interface 444_3 may interface the NAND flash memory device 442 with the controller 444.

The MoviNAND 440 may be provided with voltage sources Vcc and Vccq from the host 441. Here, the voltage source Vcc, which is 3 V, may be provided to the NAND flash memory device 442 and the voltage source Vccq, which is 1.8 V or 3 V, may be provided to the controller 444.

In some embodiments, the inventive concept may be applied to a solid state drive (SSD).

Figure 24:
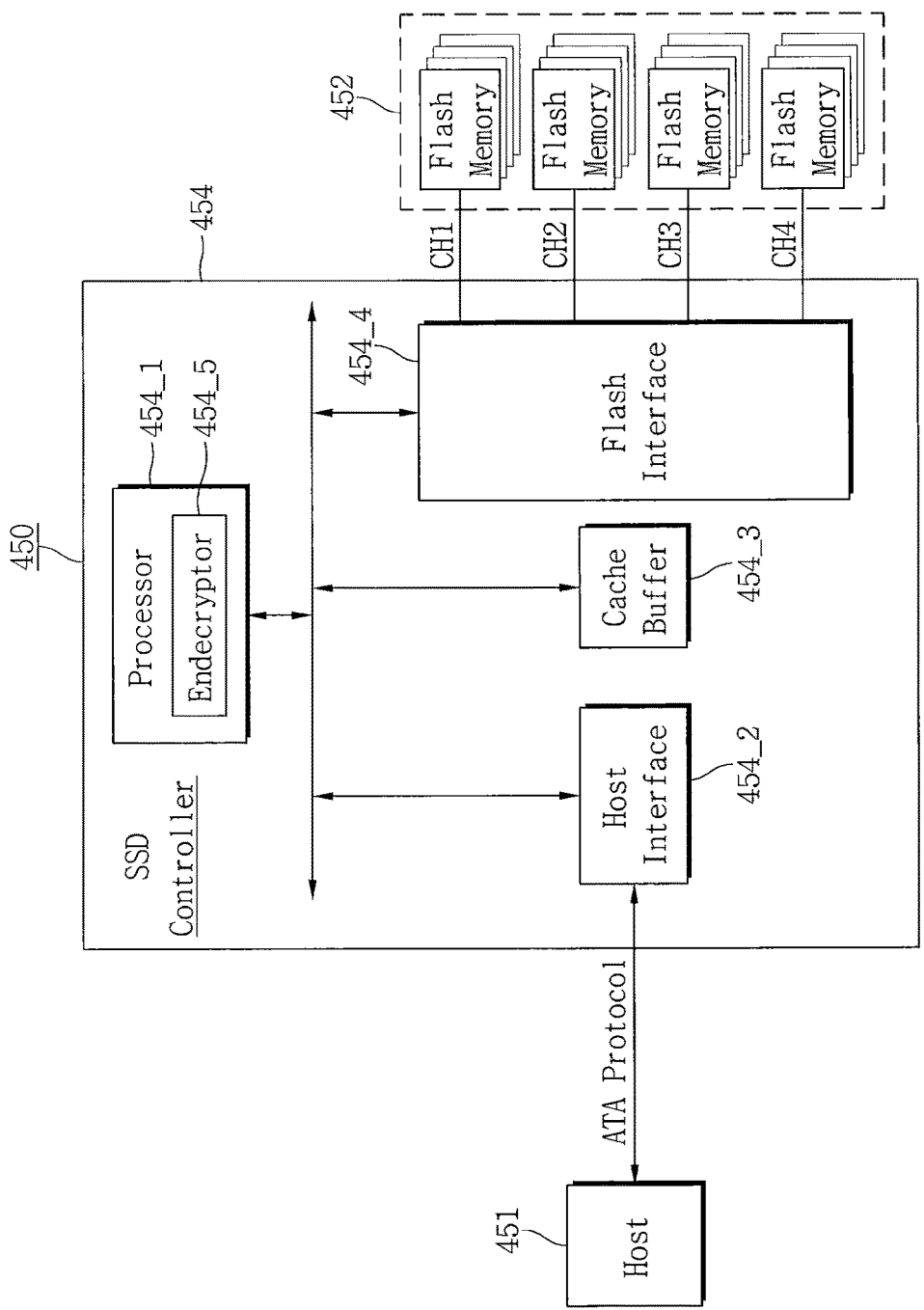
FIG. 24 is a block diagram illustrating a solid state disk (SSD) according to an embodiment of the inventive concept.

FIG. 24 is a block diagram illustrating an SSD according to some embodiments of the inventive concept.

Referring to FIG. 24, the SSD 450 may include a plurality of flash memory devices 452 and a SSD controller 454.

In some embodiments, each of the plurality of flash memory devices 452 may be embodied in a NAND flash memory.

The SSD controller 454 may include a central processing unit (CPU) 454_1, a host interface 454_2, a cache buffer 454_3, and a flash interface 454_4.

The CPU 454_1 may include an endecryptor 454_5. Here, the endecryptor 454_5 may be the endecryptor 100 shown in FIG. 7.

The host interface 454_2 may communicate with the host 451 through an ATA protocol according to control of the CPU 454_1. Here, the host interface 454_2 may include one of an serial advanced technology attachment (SATA) interface, a parallel advanced technology attachment (PATA) interface, and an external serial advanced technology attachment (ESATA) interface.

Data input from the host 451 through the host interface 454_2 or data to be transmitted to the host 451 may be transmitted through the cache buffer 454_3 without passing through a CPU bus according to control of the CPU 454_1.

The cache buffer 454_3 may temporarily store data between an external device and the flash memory devices 452. Moreover, the cache buffer 454_3 may be used to store an operating program by the CPU 454_1. The cache buffer 454_3 may be regarded as a type of a buffer memory and embodied in an SRAM.

The flash interface 454_4 may provide an interface between the flash memory devices 452 and the SSD controller 454. The flash interface 454_4 may support a NAND flash memory, an One-NAND flash memory, a multi-level flash memory, and a single-level flash memory.

Figure 25:
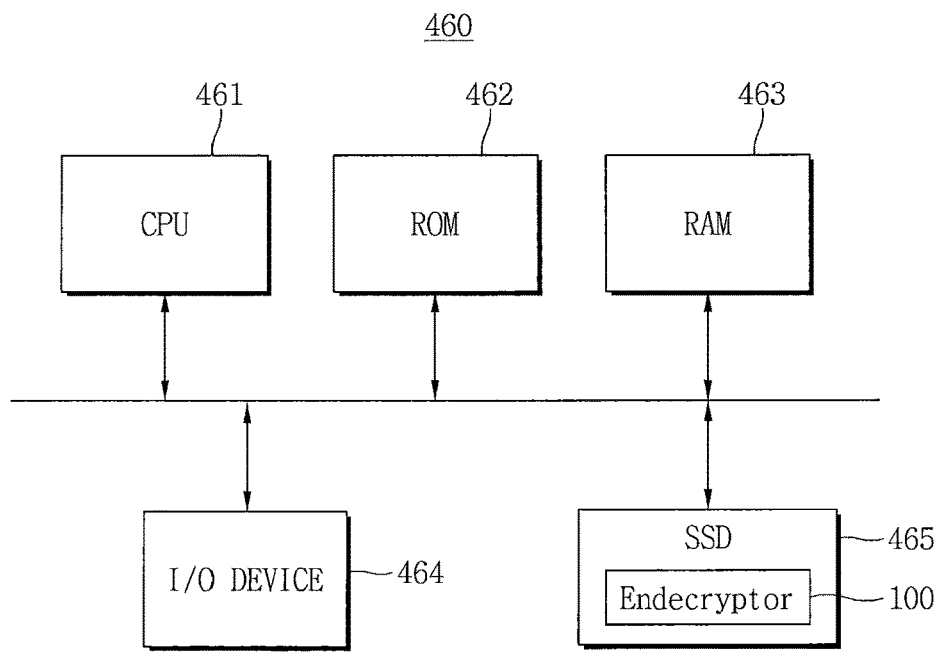
FIG. 25 is a block diagram illustrating a computing system according to an embodiment of the inventive concept.

FIG. 25 is a block diagram illustrating a computing system according to some embodiments of the inventive concept.

Referring to FIG. 25, a computing system 460 may include a CPU 461, a ROM 462, a random access memory (RAM) 463, an input and output device 464, and an SSD 465.

The CPU 461 may be connected to a system bus. The ROM 462 may store data used to operate the computing system 460. The data may include a start command sequence, or a fundamental input and output operating system sequence (e.g., BIOS). The RAM 463 may temporarily store data generated by the CPU 461.

The input and output device 464 may be connected to a system bus through input and output devices such as a keyboard, a pointing device (e.g., a mouse), a monitor, and a modem.

In some embodiment, the SSD 465 may include the endecryptor 100 shown in FIG. 7.

Figure 26:
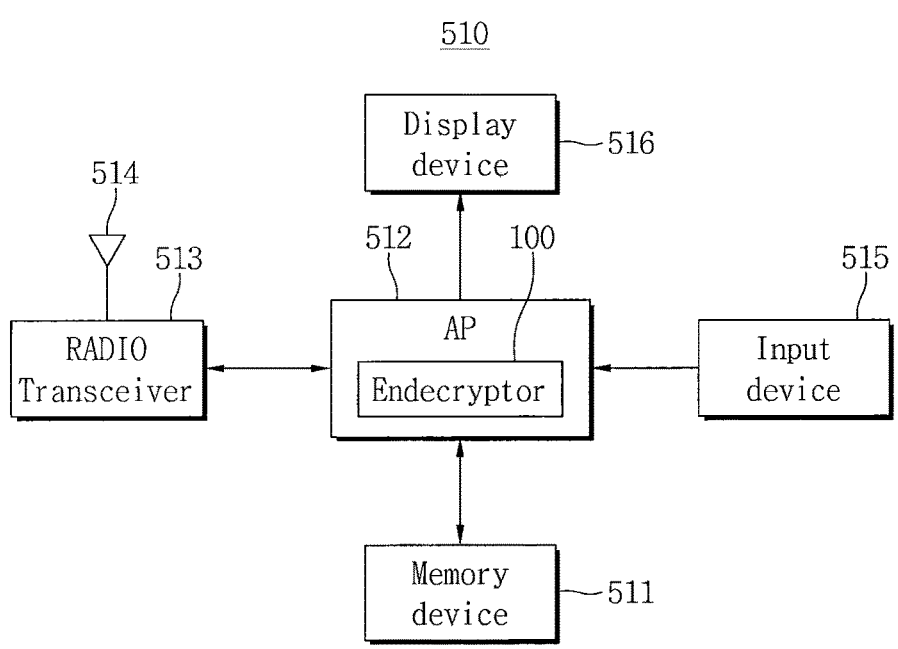
FIG. 26 shows a block diagram of a computer system 510 that includes the endecryptor 100 illustrated in FIG. 7, according to an embodiment of the inventive concept.

FIG. 26 shows a block diagram of a computer system 510 that includes the endecryptor 100 illustrated in FIG. 7, according to some embodiments of the inventive concept.

Referring to FIG. 26, the computer system 510 includes a memory device 511, an application processor (AP) 512 including a memory controller for controlling the memory device 511, a radio transceiver 513, an antenna 514, an input device 515, and a display device 516.

The radio transceiver 513 may transmit or receive a radio signal via the antenna 514. For example, the radio transceiver 513 may transform a radio signal received via the antenna 514 into a signal to be processed by the AP 512.

Thus, the AP 512 may process the radio signal output from the radio transceiver 513 and transmit the processed signal to the display device 516. Also, the radio transceiver 513 may transform a signal output from the AP 512 into a radio signal and transmit the radio signal to an external device via the antenna 514.

The input device 515 is a device via which a control signal for controlling an operation of the AP 512 or data to be processed by the AP 512 is input, and may be embodied as a pointing device such as a touch pad and a computer mouse, a keypad, or a keyboard.

In some embodiments, the AP 512 may include the endecryptor 100 shown in FIG. 7.

Figure 27:
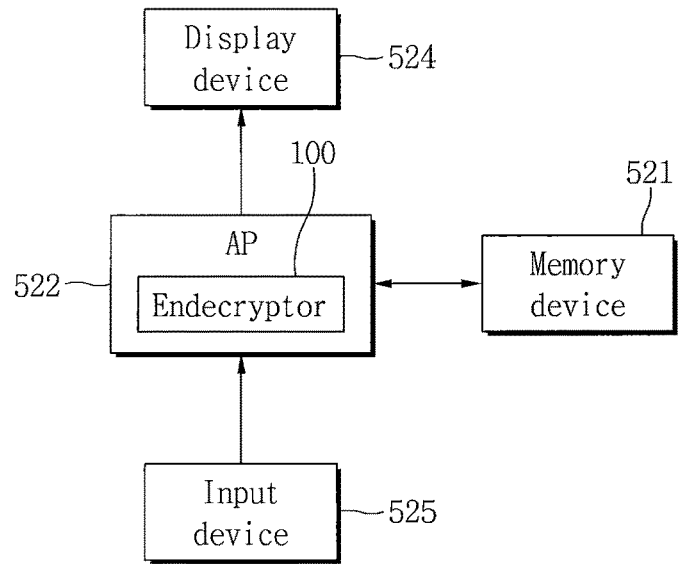
FIG. 27 shows a block diagram of a computer system 520 that includes the endecryptor 100 illustrated in FIG. 7, according to another embodiment of the inventive concept.

FIG. 27 shows a block diagram of a computer system 520 that includes the endecryptor 100 illustrated in FIG. 7, according to some embodiments of the inventive concept.

Referring to FIG. 27, the computer system 520 may be embodied as a personal computer (PC), a network server, a table PC, a net-book, an e-reader, a personal digital assistant (PDA), a portable multimedia player (PMP), an MP3 player, or an MP4 player.

The computer system 520 includes a memory device 521, an AP 522 including a memory controller for controlling the memory device 521, an input device 523, and a display device 524.

The AP 522 may display data stored in the memory device 521 on the display device 524 according to data input via the input device 523. For example, the input device 523 may be embodied as a pointing device such as a touch pad and a computer mouse, a keypad, or a keyboard. The AP 522 may control overall operations of the computer system 520 and operation of the memory device 521.

In some embodiments, the memory device 521 may include the memory device 100 shown in FIG. 1.

Figure 28:
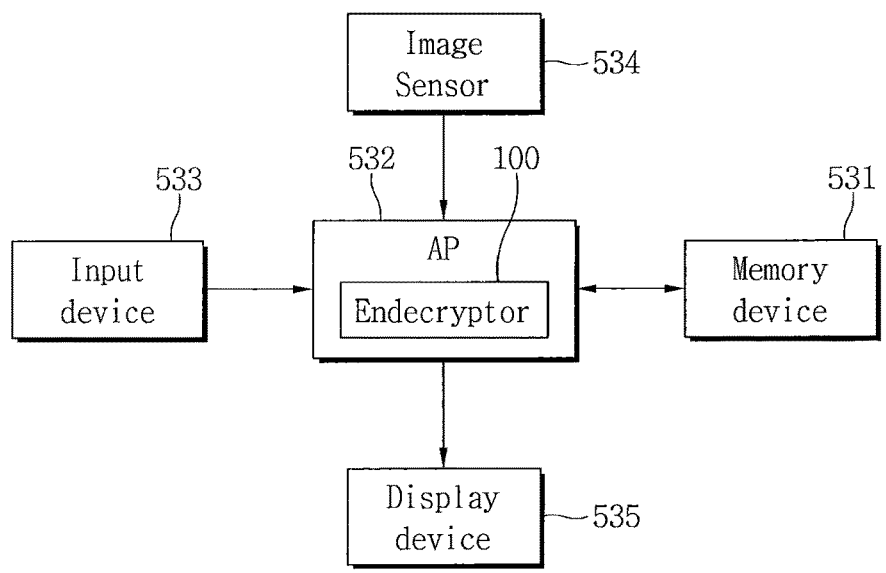
FIG. 28 shows a block diagram of a computer system 230 that includes the endecryptor 100 illustrated in FIG. 7, according to still another embodiment of the inventive concept.

FIG. 28 shows a block diagram of a computer system 530 that includes the endecryptor 100 illustrated in FIG. 7, according to some embodiments of the inventive concept.

Referring to FIG. 28, the computer system 530 may be embodied as an image process device, e.g., a digital camera or a mobile phone, a smart-phone, or a tablet PC with a built-in digital camera.

The computer system 530 includes a memory device 531, an AP 532 including a memory controller for controlling the memory device 531, an input device 533, an image sensor 534, and a display device 535.

The image sensor 534 transforms an optical image into digital signals. The digital signals are transmitted to the AP 532. According to control of the AP 532, the digital signals may be displayed on the display device 535 or stored in the memory device 531.

Also, data stored in the memory device 531 may be displayed on the display device 535 under control of the AP 532.

The input device 533 is a device via which a control signal for controlling operation of the AP 532 or data to be processed by the AP 532 is input, and may be embodied as a pointing device such as a touch pad and a computer mouse, a keypad, or a keyboard.

In some embodiments, the AP 532 may include the endecryptor 100 shown in FIG. 7.

The endecryptor according to some embodiments of the inventive concept can perform a high-speed operation.

Further, the endecryptor according to some embodiments can defend an attack from an attacker.

The inventive concept may be applied to a smart-phone, an application processor or a system-on-chip (SoC) which includes an endecryptor.

Although a few embodiments have been described, those skilled in the art will readily appreciate that many modifications are possible without materially departing from the novel teachings and advantages. Accordingly, all such modifications are intended to be included within the scope of this inventive concept as defined in the claims.

What is claimed is:

1. A system, comprising:
a first SBOX configured to receive first input data and to replace the first input data with first substitution data based on a first look-up table;
a second SBOX configured to receive the first input data and to replace the first input data with second substitution data based on a second look-up table different from the first look-up table, the second substitution data is different from the first substitution data; and
a first logic gate configured to receive the first substitution data and the second substitution data, and to perform a logical operation on the first substitution data and the second substitution data to generate first combined substitution data, the first combined substitution data is equal to the replaced result of a SBOX that receives the first input data and replace the first input data based on a standard look-up table being different from the second look-up table.

2. The system of claim 1, further comprising:
an input terminal configured to transmit the first input data to the first SBOX and the second SBOX,
wherein the input terminal comprises pre-charge logic.

3. The system of claim 1, wherein the first input data is based on a combination of round key and plain text.

4. The system of claim 1, wherein the first input data comprises N first input data,
wherein the first substitution data comprises M first substitution data and the second substitution data comprises M second substitution data,
wherein the first SBOX is further configured to, by using the first look-up table, replace one of the N first input data with one of the M first substitution data,
wherein the second SBOX is further configured to, by using the second look-up table replace one of the N first input data with one of the M second substitution data,
wherein N and M are positive integers that are different from each other.

5. The system of claim 4, wherein the standard look-up table is based on an N:N mapping scheme.

6. The system of claim 1, wherein each of the first and second substitution data comprises a dummy bit which is having a value selected to adjust a sum of a hamming weight of the first substitution data and a hamming weight of the second substitution data.

7. The system of claim 6, wherein a bit number of each of the first and the second substitution data is greater than that of the first input data by adding the dummy bit.

8. The system of claim 6, wherein the value of the dummy bit is selected to maintain the sum of the hamming weight of the first substitution data and the hamming weight of the second substitution data uniformly.

9. The system of claim 8, wherein
N is greater than M.

10. The system of claim 9, wherein each of the N first input data is 8 bit and N is 256.

11. The system of claim 10, wherein M is 16.

12. The system of claim 1, further comprising:
a output terminal configured to output encrypted or decrypted output data based on the first combined substitution data.

13. The system of claim 12, wherein the output terminal is configured to receive the first combined substitution data a plurality of times, and to output the first combined substitution data to a first column transformation module.

14. The system of claim 12, further comprising:
a third SBOX configured to receive second input data and to replace the second input data with third substitution data based on a third look-up table;
a fourth SBOX configured to receive the second input data and to replace the second input data with fourth substitution data based on a fourth look-up table different from the third look-up table; and
a second logic gate configured to receive the third substitution data and the fourth substitution data, and to perform a logical operation on the third substitution data and the fourth substitution data to generate second combined substitution data, wherein the second combined substitution data is equal to the replaced result of a SBOX that receives the second input data and replace the second input data based on the standard look-up table being different from the fourth look-up table.

15. The system of claim 14, wherein the output terminal is further configured to output the encrypted or decrypted output data based on the second combined substitution data.

16. A semiconductor device comprising:
an encryption module configured to replace a plain text with cipher data according to a block encryption algorithm or replace the cipher data with the plain text; and
a processor configured to process the plain text, wherein the encryption module comprises:
a first SBOX configured to receive first input data and to replace the first input data with first substitution data based on a first look-up table;
a second SBOX configured to receive the first input data and to replace the first input data with second substitution data based on a second look-up table different from the first look-up table, the second substitution data is different from the first substitution data;
an output terminal configured to output encrypted or decrypted output data based on the first and second substitution data; and
a first logic unit configured to receive the first substitution data and the second substitution data, and to perform a logical operation on the first substitution data and the second substitution data to generate first combined substitution data, the first combined substitution data is equal to the replaced result of a SBOX that receives the first input data and replace the first input data based on a standard look-up table being different from the second look-up table.

17. The control device of claim 16, wherein the first input data comprises N first input data;
wherein the first substitution data comprises M first substitution data and the second substitution data comprises M second substitution data,
wherein the first SBOX is further configured to replace one of the N first input data with one of the M first substitution data,
wherein the second SBOX is further configured to replace one of the N first input data with one of the M second substitution data,
wherein N is greater than M, and
wherein M and N are positive integers.

18. The semiconductor device of claim 16, wherein the second substitution data comprises a dummy bit which is having a value selected to adjust a sum of a hamming weight of the first substitution data and a hamming weight of the second substitution data.

19. The semiconductor device of claim 18, wherein the value of the dummy bit is selected to maintain the sum of the hamming weight of the first substitution data and the hamming weight of the second substitution data uniformly.

20. A system comprising:
a first SBOX configured to receive first input data and to replace the first input data with first substitution data based on a first look-up table;
a second SBOX, having a configuration different from the first SBOX, configured to receive the first input data and to replace the first input data with second substitution data based on a second look-up table different from the first look-up table; and
an output terminal configured to output encrypted or decrypted output data based on the first and second substitution data,
wherein at least one of the first substitution data and the second substitution data comprises a dummy bit having a value selected based on a hamming weight of the first substitution data and the second substitution data.

* * * * *